US012694000B1

(12) United States Patent
Johnson

(10) Patent No.: US 12,694,000 B1
(45) Date of Patent: Jul. 28, 2026

(54) EXCHANGE DESIGNATED COMPLEX OPTION (EDCO) SYSTEMS AND METHODS IMPLEMENTING ZERO ADDITIVE IMPACT REPRESENTATIONS OF EDCOS

(71) Applicant: CBOE EXCHANGE, INC., Chicago, IL (US)

(72) Inventor: Brett Johnson, Wichita, KS (US)

(73) Assignee: CBOE EXCHANGE, INC., Chicago, IL (US)

( * ) Notice: Subject to any disclaimer, the term of this patent is extended or adjusted under 35 U.S.C. 154(b) by 0 days.

(21) Appl. No.: 19/285,811

(22) Filed: Jul. 30, 2025

Related U.S. Application Data

(60) Provisional application No. 63/677,301, filed on Jul. 30, 2024.

(51) Int. Cl.
*G06F 16/21* (2019.01)
(52) U.S. Cl.
CPC .................................. *G06F 16/212* (2019.01)
(58) Field of Classification Search
CPC .................................................... G06F 16/212
See application file for complete search history.

(56) References Cited

U.S. PATENT DOCUMENTS

| | | | |
|---|---|---|---|
| 2011/0184848 A1* | 7/2011 | Pinkava ................. | G06Q 40/04 |
| | | | 705/37 |
| 2012/0084193 A1* | 4/2012 | Marino .................. | G06Q 40/04 |
| | | | 705/37 |
| 2024/0421941 A1* | 12/2024 | Singh ...................... | G06F 9/466 |

* cited by examiner

*Primary Examiner* — Merilyn P Nguyen
(74) *Attorney, Agent, or Firm* — MARSHALL, GERSTEIN & BORUN LLP

(57) ABSTRACT

An exchange designated complex option (EDCO) system implements zero additive impact representations of EDCOs. The system includes an order handler interfaced with an exchange platform to receive EDCOs and non-EDCO instrument requests, a matching engine, and an EDCO framework comprising an EDCO symbol processing engine. A computer memory stores an EDCO template table schema defining named EDCO templates and an EDCO symbol daily table schema for daily representations of EDCOs. A daily EDCO symbol database holds tables created according to the daily table schema. One or more processors execute the symbol processing engine to instantiate a daily set of EDCOs, generate metadata for each EDCO stored in the daily database, and designate the EDCOs for exchange on the exchange platform.

19 Claims, 18 Drawing Sheets

*EDCO Architecture Overview*

Table 1 - *edco symbol_daily table schema*

| edco_symbol_daily | | |
|---|---|---|
| effective_date (PK) | date | Effective date |
| symbol_id (PK) | symbol_t | Complex instrument symbol ID |
| edco_type (PK) | text | EDCO type (e.g., QSB) |
| edco_subtype | text | EDCO subtype (e.g., JELLY ROLL) |
| allow_mm_rest | boolean | True if market makers are allowed to rest orders |

FIG. 2A

Table 2 - *edco templates table schema*

| edco_templates | | |
|---|---|---|
| edco_type (PK) | Text | EDCO type (e.g., QSB) |
| edco_subtype | Text | EDCO subtype (e.g., JELLY ROLL) |
| allow_mm_rest | Boolean | Set to true if market makers are allowed to rest order on the COB |
| strike_min_incr_cnt | Integer | Nullable minimum strike increment count (e.g., -5) |
| strike_max_incr_cnt | Integer | Nullable minimum strike increment count (e.g., 5) |
| strike_incr_value | numeric | Nullable Strike increment value (e.g., 25.0) |

FIG. 2B

Table 3 - edco template_instances table schema

| edco_template_instances | | |
|---|---|---|
| begin_dt (PK) | Date | Dated entry start date |
| end_dt (PK) | Date | Dated entry end date |
| edco_type (PK)(FK) | Text | EDCO type (e.g., QSB) |
| edco_subtype (PK)(FK) | Text | EDCO subtype (e.g., JELLY_ROLL) |
| instance_id (PK) | integer | Unique integer identifier of the template instance |
| leg_id (PK) | integer | Unique integer identifier of the legs of a template instance |
| osi_root | text | OSI Root (e.g., SPX) |
| expire_config_name | text | Foreign key into the edco_expire_configs table |
| expire_config_sequence | integer | Expire config sequence (e.g., 1 or 2) |
| strike_config_name | text | Foreign key into the edco_strike_config table |
| strike_config_offset | numeric | Strike offset from reference strike config |
| call_put_flag | text | C= Call, P= Put |
| Ratio | integer | Leg quantity ratio |
| Side | text | B= Buy, S= Sell |

Table 4 - *edco_expire_config table schema* edco_expire_configs

| | | |
|---|---|---|
| edco_type (PK)(FK) | text | EDCO type (e.g., QSB) |
| expire_name (PK) | text | Textual expire config identifier (e.g., S1_Q1) |
| expire_sequence (PK) | integer | Cboe mapped symbol ID |
| calendar_name (FK) | text | Foreign key to edco_calendars table |
| expire_nearby | integer | Expire config nearby value. Value 1 is next to expire in associated calendar. |
| expire_adv | integer | Used to reference a pre-rolled contract by positive *expire_adv* trading days. |

FIG. 2D

Table 5 - *edco_calendars table schema* edco_calendars

| | | |
|---|---|---|
| calendar_name (PK) | text | Calendar name |
| expire_type (PK) | text | Expire type (e.g., daily, standard, etc.) |
| expire_value (PK) | integer | Expire value (e.g., for monthly calendar 1 = JAN, 2 = FEB, etc.) |

FIG. 2E

Table 6 - *edco_strike_configs table schema*

| edco_strike_configs | | |
|---|---|---|
| edco_type (PK)(FK) | text | EDCO type (e.g., QSB) |
| strike_name (PK) | text | Textual strike config identifier (e.g., BOX_SPREAD_LOW_STRIKE) |
| strike_type | text | Enum comprising "CONST" and pluggable strike algo names (e.g., FORWARD) |
| strike_type | numeric | Nullable field with non-null value on for strike_type of CONST |

FIG. 2F

Table 7 - *edco_strike_config_args table schema*

| edco_strike_config_args | | |
|---|---|---|
| edco_type (PK)(FK) | text | Foreign key to *edco_strike_config* table |
| strike_name (PK)(FK) | text | Foreign key into *edco_strike_config* table |
| strike_arg_name | text | Strike algo argument textual name (strike algo dependent) |
| strike_arg_value | text | Strike algo argument value. Algo casts per algo specific requirements. |

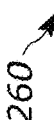

310

The sample provisioning data represent SQL INSERT statements where a statement of the form:

```
INSERT INTO edco_calendars VALUES('daily', 'daily', 1);
INSERT INTO edco_templates VALUES('PROD_A', 'BOX_SPREAD', true, 0, 0, 0);
```

Is abbreviated to:              311        312

```
('daily', 'daily', 1);
('PROD_A', 'BOX_SPREAD', true, 0, 0, 0);
```

The examples make use of the following edco_calendars provisioned values:

```
--ODTE CALENDAR ('daily', 'daily', 1);
```
~313

316~

```
--DOW CALENDAR ('monday', 'daily', 1);
('tuesday', 'daily', 2);
('wednesday', 'daily', 3);
('thursday', 'daily', 4);
('friday', 'daily', 5);
```
~314

315

```
--SERIAL MONTHLY CALENDAR ('serial', 'standard', 1);
('serial', 'standard', 2);
('serial', 'standard', 4);
('serial', 'standard', 5);
('serial', 'standard', 7);
('serial', 'standard', 8);
('serial', 'standard', 10);
('serial', 'standard', 11);
```

```
--MONTHLY CALENDAR ('monthly', 'standard', 1);
('monthly', 'standard', 2);
('monthly', 'standard', 3);
('monthly', 'standard', 4);
('monthly', 'standard', 5);
('monthly', 'standard', 6);
('monthly', 'standard', 7);
('monthly', 'standard', 8);
('monthly', 'standard', 9);
('monthly', 'standard', 10);
('monthly', 'standard', 11);
('monthly', 'standard', 12);
```

```
--QUARTERLY CALENDAR ('quarterly', 'standard', 3);
('quarterly', 'standard', 6);
('quarterly', 'standard', 9);
('quarterly', 'standard', 12);
```
~317

```
--SELECT MONTH CALENDAR ('march', 'standard', 3);
('june', 'standard', 6);
('september', 'standard', 9);
('december', 'standard', 12);
```
~318

```
edco_templates:
    ('PROD_A', 'BOX_SPREAD', true, 0, 0, 0);

edco_expire_configs:
    ('PROD_A', 'S1', 1, 'monthly', 1, 0);

edco_strike_configs:
    ('PROD_A', 'BOX_SPREAD_LOW_STRIKE', NULL, 4000.0);

edco_template_instances:
    (begin_dt, end_dt, 'PROD_A', 'BOX_SPREAD', 1, 1, 'SPX', 'S1', 1, 'BOX_SPREAD_LOW_STRIKE', 0, 'C', 1, 'B');
    (begin_dt, end_dt, 'PROD_A', 'BOX_SPREAD', 1, 2, 'SPX', 'S1', 1, 'BOX_SPREAD_LOW_STRIKE', 1000, 'C', 1, 'S');
    (begin_dt, end_dt, 'PROD_A', 'BOX_SPREAD', 1, 3, 'SPX', 'S1', 1, 'BOX_SPREAD_LOW_STRIKE', 1000, 'P', 1, 'B');
    (begin_dt, end_dt, 'PROD_A', 'BOX_SPREAD', 1, 4, 'SPX', 'S1', 1, 'BOX_SPREAD_LOW_STRIKE', 0, 'P', 1, 'S');
```

```
edco_templates:
('PROD_B', 'VERT_SPRD', true, 0, 0, 0);

edco_expire_configs:
('PROD_B', 'S1', 1, 'monthly', 1, 0);
('PROD_B', 'S2', 1, 'monthly', 2, 0);

edco_strike_configs:
('PROD_B', 'S1_ATM', 'FORWARD', NULL);
('PROD_B', 'S2_ATM', 'FORWARD', NULL);

edco_strike_config_args:
('PROD_B', 'S1_ATM', 'OSI_ROOT', 'SPX');
('PROD_B', 'S1_ATM', 'EXPIRY', 'S1');
('PROD_B', 'S1_ATM', 'ROUND_INCR', '5');
('PROD_B', 'S2_ATM', 'OSI_ROOT', 'SPX');
('PROD_B', 'S2_ATM', 'EXPIRY', 'S2');
('PROD_B', 'S2_ATM', 'ROUND_INCR', '5');

edco_template_instances:
(begin_dt, end_dt, 'PROD_B', 'VERT_SPRD', 1, 1, 'SPX', 'S1', 1, 'S1_ATM', 0, 'P', 1, 'B');
(begin_dt, end_dt, 'PROD_B', 'VERT_SPRD', 1, 2, 'SPX', 'S1', 1, 'S1_ATM', -10, 'P', 1, 'S');
(begin_dt, end_dt, 'PROD_B', 'VERT_SPRD', 2, 1, 'SPX', 'S1', 1, 'S1_ATM', 0, 'C', 1, 'B');
(begin_dt, end_dt, 'PROD_B', 'VERT_SPRD', 2, 2, 'SPX', 'S1', 1, 'S1_ATM', 10, 'C', 1, 'S');
(begin_dt, end_dt, 'PROD_B', 'VERT_SPRD', 3, 1, 'SPX', 'S2', 1, 'S2_ATM', 0, 'P', 1, 'B');
(begin_dt, end_dt, 'PROD_B', 'VERT_SPRD', 3, 2, 'SPX', 'S2', 1, 'S2_ATM', -10, 'P', 1, 'S');
(begin_dt, end_dt, 'PROD_B', 'VERT_SPRD', 4, 1, 'SPX', 'S2', 1, 'S2_ATM', 0, 'C', 1, 'B');
(begin_dt, end_dt, 'PROD_B', 'VERT_SPRD', 4, 2, 'SPX', 'S2', 1, 'S2_ATM', 10, 'C', 1, 'S');
```

```
edco templates:
('PROD_C', 'VERT_PUT_SPRD', true, -10, 0, 10);
('PROD_C', 'VERT_CALL_SPRD', true, 0, 10, 10);

edco expire_configs:
('PROD_C', 'S1', 1, 'monthly', 1, 0);
('PROD_C', 'S2', 1, 'monthly', 2, 0);

edco strike_configs:
('PROD_C', 'S1_ATM', 'FORWARD', NULL);
('PROD_C', 'S2_ATM', 'FORWARD', NULL);

edco strike_config_args:
('PROD_C', 'S1_ATM', 'OSI_ROOT', 'SPX');
('PROD_C', 'S1_ATM', 'EXPIRY', 'S1');
('PROD_C', 'S1_ATM', 'ROUND_INCR', '5');
('PROD_C', 'S2_ATM', 'OSI_ROOT', 'SPX');
('PROD_C', 'S2_ATM', 'EXPIRY', 'S2');
('PROD_C', 'S2_ATM', 'ROUND_INCR', '5');

edco template_instances:
(begin_dt, end_dt, 'PROD_C', 'VERT_PUT_SPRD', 1, 1, 'SPX', 'S1', 1, 'S1_ATM', 0, 'P', 1, 'B');
(begin_dt, end_dt, 'PROD_C', 'VERT_PUT_SPRD', 1, 2, 'SPX', 'S1', 1, 'S1_ATM', -10, 'P', 1, 'S');
(begin_dt, end_dt, 'PROD_C', 'VERT_PUT_SPRD', 2, 1, 'SPX', 'S2', 1, 'S2_ATM', 0, 'P', 1, 'B');
(begin_dt, end_dt, 'PROD_C', 'VERT_PUT_SPRD', 2, 2, 'SPX', 'S2', 1, 'S2_ATM', -10, 'P', 1, 'S');
(begin_dt, end_dt, 'PROD_C', 'VERT_CALL SPRD', 1, 1, 'SPX', 'S1', 1, 'S1_ATM', 0, 'C', 1, 'B');
(begin_dt, end_dt, 'PROD_C', 'VERT_CALL SPRD', 1, 2, 'SPX', 'S1', 1, 'S1_ATM', 10, 'C', 1, 'S');
(begin_dt, end_dt, 'PROD_C', 'VERT_CALL_SPRD', 2, 1, 'SPX', 'S2', 1, 'S2_ATM', 0, 'C', 1, 'B');
(begin_dt, end_dt, 'PROD_C', 'VERT_CALL_SPRD', 2, 2, 'SPX', 'S2', 1, 'S2_ATM', 10, 'C', 1, 'S');
```

```
edco_templates:
('PROD_D', 'JELLY_ROLL', true, 0, 0, 0);

edco_expire_configs:
('PROD_D', 'ODTE_L1', 1, 'daily', 1, 0);
('PROD_D', 'ODTE_L1', 2, 'quarterly', 1, 19);
('PROD_D', 'F1_L1', 1, 'friday', 1, 0);
('PROD_D', 'F1_L1', 2, 'quarterly', 1, 19);
('PROD_D', 'S1_L1', 1, 'monthly', 1, 0);
('PROD_D', 'S1_L1', 2, 'quarterly', 1, 19);
('PROD_D', 'L1', 1, 'quarterly', 1, 19);

edco_strike_configs:
('PROD_D', 'L1_ATM', 'FORWARD', NULL);

edco_strike_config_args:
('PROD_D', 'L1_ATM', 'OSI_ROOT', 'SPX');
('PROD_D', 'L1_ATM', 'EXPIRY', 'L1');
('PROD_D', 'L1_ATM', 'ROUND_INCR', '5');

edco_template_instances:
(begin_dt, end_dt, 'PROD_D', 'JELLY_ROLL', 1, 1, 'SPX', 'ODTE_L1', 1, 'L1_ATM', 0, 'C', 1, 'S');
(begin_dt, end_dt, 'PROD_D', 'JELLY_ROLL', 1, 2, 'SPX', 'ODTE_L1', 1, 'L1_ATM', 0, 'P', 1, 'B');
(begin_dt, end_dt, 'PROD_D', 'JELLY_ROLL', 1, 3, 'SPX', 'ODTE_L1', 2, 'L1_ATM', 0, 'C', 1, 'B');
(begin_dt, end_dt, 'PROD_D', 'JELLY_ROLL', 1, 4, 'SPX', 'ODTE_L1', 2, 'L1_ATM', 0, 'P', 1, 'S');
(begin_dt, end_dt, 'PROD_D', 'JELLY_ROLL', 2, 1, 'SPX', 'F1_L1', 1, 'L1_ATM', 0, 'C', 1, 'S');
(begin_dt, end_dt, 'PROD_D', 'JELLY_ROLL', 2, 2, 'SPX', 'F1_L1', 1, 'L1_ATM', 0, 'P', 1, 'B');
(begin_dt, end_dt, 'PROD_D', 'JELLY_ROLL', 2, 3, 'SPX', 'F1_L1', 2, 'L1_ATM', 0, 'C', 1, 'B');
(begin_dt, end_dt, 'PROD_D', 'JELLY_ROLL', 2, 4, 'SPX', 'F1_L1', 2, 'L1_ATM', 0, 'P', 1, 'S');
(begin_dt, end_dt, 'PROD_D', 'JELLY_ROLL', 3, 1, 'SPX', 'S1_L1', 1, 'L1_ATM', 0, 'C', 1, 'S');
(begin_dt, end_dt, 'PROD_D', 'JELLY_ROLL', 3, 2, 'SPX', 'S1_L1', 1, 'L1_ATM', 0, 'P', 1, 'B');
(begin_dt, end_dt, 'PROD_D', 'JELLY_ROLL', 3, 3, 'SPX', 'S1_L1', 2, 'L1_ATM', 0, 'C', 1, 'B');
(begin_dt, end_dt, 'PROD_D', 'JELLY_ROLL', 3, 4, 'SPX', 'S1_L1', 2, 'L1_ATM', 0, 'P', 1, 'S');
```

FIG. 3E

Table 8 - Quoted Spread Book edco_type and edco_subtype values

| edco_type | edco_subtype | Description |
|-----------|--------------|-------------|
| QSB | BOX_SPREAD | Quoted Spread Book Box Spreads |
| QSB | BOX_SWAP | Quoted Spread Book Box Spread Rolls (aka, Box Swaps) |
| QSB | JELLY_ROLL | Quoted Spread Book Combo Rolls (aka, Jelly Rolls) |

*Quoted Spread Book Box Spread Expirations*

| Serial-1 | Serial-2 | Serial-3 | Serial-4 | Qtr-1 | Qtr-2 | Qtr-3 | Dec-1 | Dec-2 | Dec-3 |
|---|---|---|---|---|---|---|---|---|---|
| X | X | X | X | X | X | X | X | X | X |

```
edco templates:
('QSB', 'BOX_SPREAD', 'true', NULL, NULL, NULL);

edco expire_configs:
('QSB', 'S1', 1, 'serial', 1, 0);
('QSB', 'S2', 1, 'serial', 2, 0);
('QSB', 'S3', 1, 'serial', 3, 0);
('QSB', 'S4', 1, 'serial', 4, 0);
('QSB', 'Q1', 1, 'quarterly', 1, 0);
('QSB', 'Q2', 1, 'quarterly', 2, 0);
('QSB', 'Q3', 1, 'quarterly', 3, 0);
('QSB', 'Z1', 1, 'december', 1, 0);
('QSB', 'Z2', 1, 'december', 2, 0);
('QSB', 'Z3', 1, 'december', 3, 0);

edco strike_configs:
('QSB', 'BOX_SPRD_LOW_STRIKE', 'CONST', '4000');

edco template_instances:
(begin_dt, end_dt, 'QSB', 'BOX_SPREAD', 1, 1, 'SPX', 'S1', 1, 'BOX_SPRD_LOW_STRIKE', 0, 'P', 1, 'S');
(begin_dt, end_dt, 'QSB', 'BOX_SPREAD', 1, 2, 'SPX', 'S1', 1, 'BOX_SPRD_LOW_STRIKE', 1000, 'P', 1, 'B');
(begin_dt, end_dt, 'QSB', 'BOX_SPREAD', 1, 3, 'SPX', 'S1', 1, 'BOX_SPRD_LOW_STRIKE', 0, 'C', 1, 'B');
(begin_dt, end_dt, 'QSB', 'BOX_SPREAD', 1, 4, 'SPX', 'S1', 1, 'BOX_SPRD_LOW_STRIKE', 1000, 'C', 1, 'S');
(begin_dt, end_dt, 'QSB', 'BOX_SPREAD', 2, 1, 'SPX', 'S2', 1, 'BOX_SPRD_LOW_STRIKE', 0, 'P', 1, 'S');
(begin_dt, end_dt, 'QSB', 'BOX_SPREAD', 2, 2, 'SPX', 'S2', 1, 'BOX_SPRD_LOW_STRIKE', 1000, 'P', 1, 'B');
(begin_dt, end_dt, 'QSB', 'BOX_SPREAD', 2, 3, 'SPX', 'S2', 1, 'BOX_SPRD_LOW_STRIKE', 0, 'C', 1, 'B');
(begin_dt, end_dt, 'QSB', 'BOX_SPREAD', 2, 4, 'SPX', 'S2', 1, 'BOX_SPRD_LOW_STRIKE', 1000, 'C', 1, 'S');
(begin_dt, end_dt, 'QSB', 'BOX_SPREAD', 3, 1, 'SPX', 'S3', 1, 'BOX_SPRD_LOW_STRIKE', 0, 'P', 1, 'S');
(begin_dt, end_dt, 'QSB', 'BOX_SPREAD', 3, 2, 'SPX', 'S3', 1, 'BOX_SPRD_LOW_STRIKE', 1000, 'P', 1, 'B');
```

FIG. 4B

```
(begin_dt, end_dt, 'QSB', 'BOX_SPREAD', 3, 3, 'SPX', 'S3', 1, 'BOX_SPRD_LOW_STRIKE', 0, 'C', 1, 'B');
(begin_dt, end_dt, 'QSB', 'BOX_SPREAD', 3, 4, 'SPX', 'S3', 1, 'BOX_SPRD_LOW_STRIKE', 1000, 'C', 1, 'S');
(begin_dt, end_dt, 'QSB', 'BOX_SPREAD', 4, 1, 'SPX', 'S4', 1, 'BOX_SPRD_LOW_STRIKE', 0, 'P', 1, 'S');
(begin_dt, end_dt, 'QSB', 'BOX_SPREAD', 4, 2, 'SPX', 'S4', 1, 'BOX_SPRD_LOW_STRIKE', 1000, 'P', 1, 'B');
(begin_dt, end_dt, 'QSB', 'BOX_SPREAD', 4, 3, 'SPX', 'S4', 1, 'BOX_SPRD_LOW_STRIKE', 0, 'C', 1, 'S');
(begin_dt, end_dt, 'QSB', 'BOX_SPREAD', 4, 4, 'SPX', 'S4', 1, 'BOX_SPRD_LOW_STRIKE', 1000, 'C', 1, 'B');
(begin_dt, end_dt, 'QSB', 'BOX_SPREAD', 5, 1, 'SPX', 'Q1', 1, 'BOX_SPRD_LOW_STRIKE', 0, 'P', 1, 'B');
(begin_dt, end_dt, 'QSB', 'BOX_SPREAD', 5, 2, 'SPX', 'Q1', 1, 'BOX_SPRD_LOW_STRIKE', 1000, 'P', 1, 'S');
(begin_dt, end_dt, 'QSB', 'BOX_SPREAD', 5, 3, 'SPX', 'Q1', 1, 'BOX_SPRD_LOW_STRIKE', 0, 'C', 1, 'S');
(begin_dt, end_dt, 'QSB', 'BOX_SPREAD', 5, 4, 'SPX', 'Q1', 1, 'BOX_SPRD_LOW_STRIKE', 1000, 'C', 1, 'B');
(begin_dt, end_dt, 'QSB', 'BOX_SPREAD', 6, 1, 'SPX', 'Q2', 1, 'BOX_SPRD_LOW_STRIKE', 0, 'P', 1, 'S');
(begin_dt, end_dt, 'QSB', 'BOX_SPREAD', 6, 2, 'SPX', 'Q2', 1, 'BOX_SPRD_LOW_STRIKE', 1000, 'P', 1, 'B');
(begin_dt, end_dt, 'QSB', 'BOX_SPREAD', 6, 3, 'SPX', 'Q2', 1, 'BOX_SPRD_LOW_STRIKE', 0, 'C', 1, 'S');
(begin_dt, end_dt, 'QSB', 'BOX_SPREAD', 6, 4, 'SPX', 'Q2', 1, 'BOX_SPRD_LOW_STRIKE', 1000, 'C', 1, 'B');
(begin_dt, end_dt, 'QSB', 'BOX_SPREAD', 7, 1, 'SPX', 'Q3', 1, 'BOX_SPRD_LOW_STRIKE', 0, 'P', 1, 'B');
(begin_dt, end_dt, 'QSB', 'BOX_SPREAD', 7, 2, 'SPX', 'Q3', 1, 'BOX_SPRD_LOW_STRIKE', 1000, 'P', 1, 'S');
(begin_dt, end_dt, 'QSB', 'BOX_SPREAD', 7, 3, 'SPX', 'Q3', 1, 'BOX_SPRD_LOW_STRIKE', 0, 'C', 1, 'S');
(begin_dt, end_dt, 'QSB', 'BOX_SPREAD', 7, 4, 'SPX', 'Q3', 1, 'BOX_SPRD_LOW_STRIKE', 1000, 'C', 1, 'B');
(begin_dt, end_dt, 'QSB', 'BOX_SPREAD', 8, 1, 'SPX', 'Z1', 1, 'BOX_SPRD_LOW_STRIKE', 0, 'P', 1, 'S');
(begin_dt, end_dt, 'QSB', 'BOX_SPREAD', 8, 2, 'SPX', 'Z1', 1, 'BOX_SPRD_LOW_STRIKE', 1000, 'P', 1, 'B');
(begin_dt, end_dt, 'QSB', 'BOX_SPREAD', 8, 3, 'SPX', 'Z1', 1, 'BOX_SPRD_LOW_STRIKE', 0, 'C', 1, 'S');
(begin_dt, end_dt, 'QSB', 'BOX_SPREAD', 8, 4, 'SPX', 'Z1', 1, 'BOX_SPRD_LOW_STRIKE', 1000, 'C', 1, 'B');
(begin_dt, end_dt, 'QSB', 'BOX_SPREAD', 9, 1, 'SPX', 'Z2', 1, 'BOX_SPRD_LOW_STRIKE', 0, 'P', 1, 'B');
(begin_dt, end_dt, 'QSB', 'BOX_SPREAD', 9, 2, 'SPX', 'Z2', 1, 'BOX_SPRD_LOW_STRIKE', 1000, 'P', 1, 'S');
(begin_dt, end_dt, 'QSB', 'BOX_SPREAD', 9, 3, 'SPX', 'Z2', 1, 'BOX_SPRD_LOW_STRIKE', 0, 'C', 1, 'S');
(begin_dt, end_dt, 'QSB', 'BOX_SPREAD', 9, 4, 'SPX', 'Z2', 1, 'BOX_SPRD_LOW_STRIKE', 1000, 'C', 1, 'B');
(begin_dt, end_dt, 'QSB', 'BOX_SPREAD', 10, 1, 'SPX', 'Z3', 1, 'BOX_SPRD_LOW_STRIKE', 0, 'P', 1, 'S');
(begin_dt, end_dt, 'QSB', 'BOX_SPREAD', 10, 2, 'SPX', 'Z3', 1, 'BOX_SPRD_LOW_STRIKE', 1000, 'P', 1, 'B');
(begin_dt, end_dt, 'QSB', 'BOX_SPREAD', 10, 3, 'SPX', 'Z3', 1, 'BOX_SPRD_LOW_STRIKE', 0, 'C', 1, 'B');
(begin_dt, end_dt, 'QSB', 'BOX_SPREAD', 10, 4, 'SPX', 'Z3', 1, 'BOX_SPRD_LOW_STRIKE', 1000, 'C', 1, 'S');
```

FIG. 4B (Continued)

Quoted Spread Book Box Swap expiration pairs

|  | | To Expiry | | | | | | | |
| | Serial-2 | Serial-3 | Serial-4 | Qtr-1 | Qtr-2 | Qtr-3 | Dec-1 | Dec-2 | Dec-3 |
|---|---|---|---|---|---|---|---|---|---|
| Serial-1 | X̲ | X | X | X | X | X | | | |
| Serial-2 | | X | X | X | X | X | | | |
| Serial-3 | | | X | | X | X | | | |
| Serial-4 | | | X | | X | X | | | |
| Qtr-1 | | X | X | | X | X | X | X | X |
| Qtr-2 | | | | | | X | | | |

From Expiry

Note- On dates where the From and To expiry are identical, no associated spread is created

430

Quoted Spreadbook Jelly Roll expiration pairs

| From Expiry \ To Expiry | Tmr | Friday-1 | Serial-1 | Serial-2 | Serial-3 | Qtr-1 | Qtr-2 | Qtr-3 |
|---|---|---|---|---|---|---|---|---|
| Today | WW | WW | WX | | | WX | WX | |
| Tmr | | | | | | WX | WX | |
| Friday-1 | | | | | | WX | WX | |
| Serial-1 | | | | | | XX | XX | |
| Serial-2 | | | | | | XX | XX | |
| Serial-3 | | | | | | | XX | XX |
| Qtr-1 | | | | | | | XX | |
| Qtr-2 | | | | | | | | XX |

Note- On dates where Tmr and/or Friday-1 are identical to Qtr-1, no associated spread is created

440

*QSB Symbol Reference Data JSON File Format*        500

```
[
  {
    "Complex Instrument Type": "QSB",
    "Complex Instrument Subtype": "BOX_SPREAD",
    "Symbols":
      [
        {
          "Complex Instrument Id": "000u56",
          "Leg Count": "4",
          "Leg Data": [
            {
              "Leg Symbol": "000ab1",
              "Leg Ratio": "1.0",
              "OSI Symbol": "SPX 231117C04000000"
            },
            {
              "Leg Symbol": "000ab2",
              "Leg Ratio": "1.0",
              "OSI Symbol": "SPX 231117P05000000"
            },
            {
              "Leg Symbol": "000ab3",
              "Leg Ratio": "-1.0",
              "OSI Symbol": "SPX 231117C05000000"
            },
            {
              "Leg Symbol": "000ab4",
              "Leg Ratio": "-1.0",
              "OSI Symbol": "SPX 231117P04000000"
            }
          ]
        },
        ...
```

FIG. 5

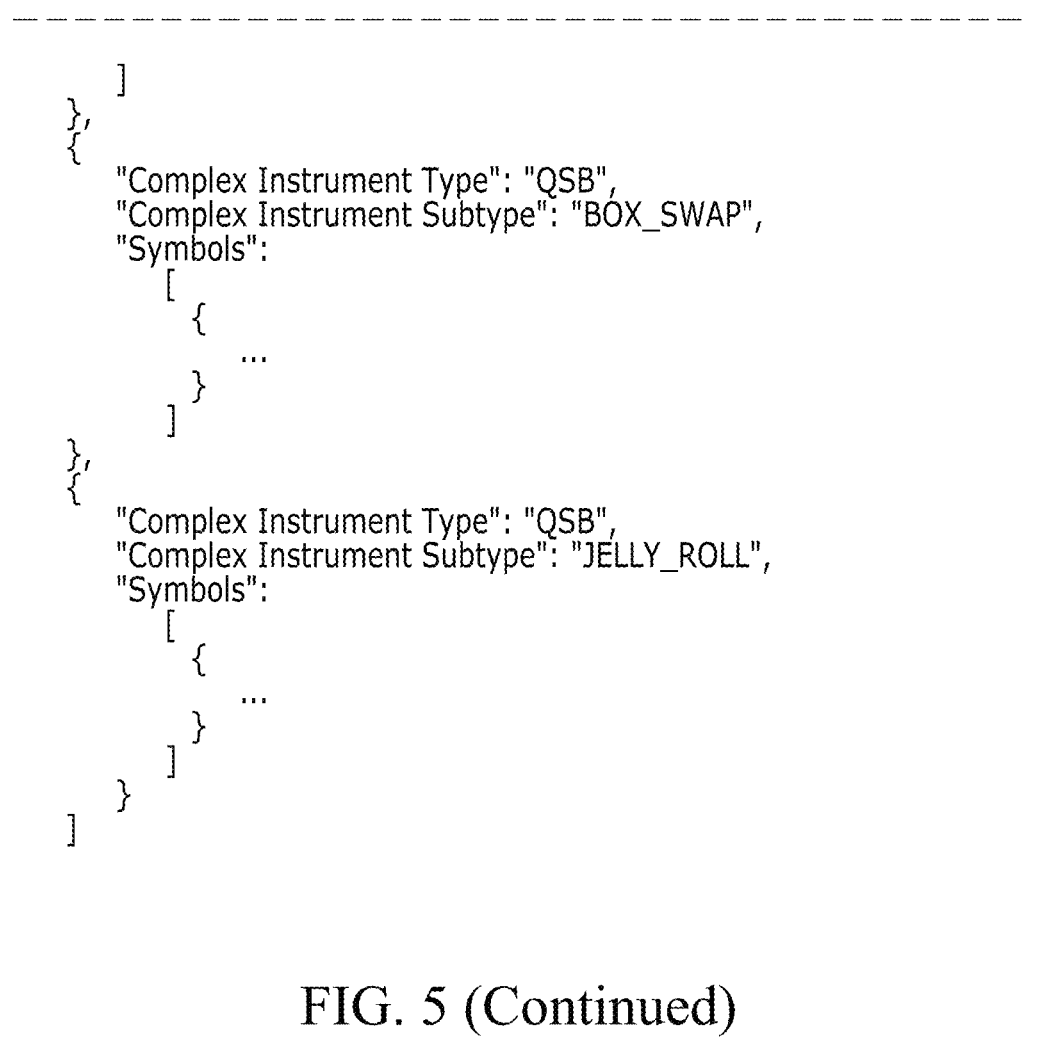

```
        ]
    },
    {
        "Complex Instrument Type": "QSB",
        "Complex Instrument Subtype": "BOX_SWAP",
        "Symbols":
            [
                {
                    ...
                }
            ]
    },
    {
        "Complex Instrument Type": "QSB",
        "Complex Instrument Subtype": "JELLY_ROLL",
        "Symbols":
            [
                {
                    ...
                }
            ]
    }
]
```

FIG. 5 (Continued)

EXCHANGE DESIGNATED COMPLEX OPTION (EDCO) SYSTEMS AND METHODS IMPLEMENTING ZERO ADDITIVE IMPACT REPRESENTATIONS OF EDCOS

RELATED APPLICATIONS

This application claims the benefit of U.S. Provisional Application No. 63/677,301 (filed on Jul. 30, 2024), the entirety of which is incorporated by reference herein.

FIELD OF THE DISCLOSURE

The present disclosure generally relates to exchange designated complex option (EDCO) systems and methods, and, more particularly, EDCO systems and methods implementing zero additive impact representations of EDCOs.

BACKGROUND

Typical complex instruments listed for exchange on an index platform are inflexible and require rewrite of existing code and changes to the exchange platform in order to update the exchange platform to execute the complex instruments. Such code rewrites and changes typically increases the complexity, such as computer resources (such as increased processor utilization and memory requirements) of the underlying exchange platform itself. Accordingly, a problem arises when attempting to augment or otherwise reconfigure an exchange computing system to execute complex instruments thereof given the increased complexity and computational load or otherwise impact.

For this reason, there is a need for EDCO systems and methods implementing zero additive impact representations of EDCOs.

BRIEF SUMMARY

In some aspects, the techniques described herein relate to an exchange designated complex option (EDCO) system implementing zero additive impact representations of EDCOs, the EDCO system including: an order handler communicatively coupled to an exchange platform and configured to receive requests for EDCOs and non-EDCO instruments; a matching engine communicatively coupled to the order handler and the exchange platform; an ECDO framework communicatively coupled to the matching engine and including an EDCO symbol processing engine; a computer memory storing an EDCO template table schema defining provisioned named EDCO templates for instantiating zero additive impact representations of each of a plurality of EDCOs for exchange on the exchange platform, wherein the computer memory further stores an ECDO symbol daily table schema configured to define daily representations of the plurality of EDCOs; a daily EDCO symbol database including an EDCO symbol daily database table created according to the ECDO symbol daily table schema, and; one or more processors configured to execute computing instructions stored in a tangible, non-transitory computer-readable storage medium, where the computing instructions, when executed by the one or more processors, are configured to: execute the EDCO symbol processing engine to create a daily set of EDCOs, wherein each EDCO of the daily set of EDCOs includes an instantiated version of an EDCO created according to the ECDO symbol daily table schema, generate metadata for each EDCO of the daily set of EDCOs, wherein the metadata is stored in the daily EDCO symbol database, and designate each EDCO of the daily set of EDCOs for exchange on the exchange platform.

In some aspects, the techniques described herein relate to an exchange designated complex option (EDCO) method implementing zero additive impact representations of EDCOs, the EDCO method including: executing an EDCO symbol processing engine to create a daily set of EDCOs, wherein each EDCO of the daily set of EDCOs includes an instantiated version of an EDCO created according to an ECDO symbol daily table schema, wherein the EDCO symbol processing engine is implemented as part of an ECDO framework communicatively coupled to a matching engine, the matching engine communicatively coupled to an order handler and an exchange platform, and the order handler communicatively coupled to an exchange platform and configured to receive requests for EDCOs and non-EDCO instruments, wherein the ECDO symbol daily table schema defines daily representations instantiated from a plurality of EDCOs for trade in a given day, and wherein an EDCO template table schema defines provisioned named EDCO templates for instantiating zero additive impact representations of each of the plurality of EDCOs for exchange on the exchange platform; generating metadata for each EDCO of the daily set of EDCOs, wherein the metadata is stored in a daily EDCO symbol database, the daily EDCO symbol database including an EDCO symbol daily database table created according to the ECDO symbol daily table schema; and designating each EDCO of the daily set of EDCOs for exchange on the exchange platform.

In some aspects, the techniques described herein relate to a tangible, non-transitory computer-readable medium storing instructions for implementing zero additive impact representations of exchange designated complex options (EDCOs), that when executed by one or more processors cause the one or more processors to: execute an EDCO symbol processing engine to create a daily set of EDCOs, wherein each EDCO of the daily set of EDCOs includes an instantiated version of an EDCO created according to an ECDO symbol daily table schema, wherein the EDCO symbol processing engine is implemented as part of an ECDO framework communicatively coupled to a matching engine, the matching engine communicatively coupled to an order handler and an exchange platform, and the order handler communicatively coupled to an exchange platform and configured to receive requests for EDCOs and non-EDCO instruments, wherein the ECDO symbol daily table schema defines daily representations instantiated from a plurality of EDCOs for trade in a given day, and wherein an EDCO template table schema defines provisioned named EDCO templates for instantiating zero additive impact representations of each of the plurality of EDCOs for exchange on the exchange platform; generate metadata for each EDCO of the daily set of EDCOs, wherein the metadata is stored in a daily EDCO symbol database, the daily EDCO symbol database including an EDCO symbol daily database table created according to the ECDO symbol daily table schema; and designate each EDCO of the daily set of EDCOs for exchange on the exchange platform.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example EDCO symbol daily table schema table (Table 1) configured to define daily representations of the plurality of EDCOs in a database, which may be implemented by the EDCO system of FIG. 1 in accordance with various embodiments disclosed herein.

FIG. 2B illustrates an example EDCO templates table scheme table (Table 2) defining provisioned named EDCO templates for instantiating zero additive impact representations of each of a plurality of EDCOs for exchange on the exchange platform and from which the daily representations of the plurality EDCOs as described for of 2A may be instantiated, and which may be implemented by the EDCO system of FIG. 1 in accordance with various embodiments disclosed herein.

FIG. 2C illustrates an example EDCO template instances table schema database table (Table 3) for a database table for defining EDCO instances, which may be implemented by the EDCO system of FIG. 1 in accordance with various embodiments disclosed herein.

FIG. 2D illustrates an example EDCO expire configurations table schema database table (Table 4) for a database table, which may be implemented by the EDCO system of FIG. 1 in accordance with various embodiments disclosed herein.

FIG. 2E illustrates an example EDCO calendars table schema database table (Table 5) for a database table, which may be implemented by the EDCO system of FIG. 1 in accordance with various embodiments disclosed herein.

FIG. 2F illustrates an example EDCO strike configurations table schema database table (Table 6) for a database table, which may be implemented by the EDCO system of FIG. 1 in accordance with various embodiments disclosed herein.

FIG. 2G illustrates an example EDCO strike configurations arguments table schema database table (Table 7) for a database table, which may be implemented by the EDCO system of FIG. 1 in accordance with various embodiments disclosed herein.

FIG. 3A illustrates example code for inserting calendar data into a database, which may be implemented by the EDCO system of FIG. 1 in accordance with various embodiments disclosed herein.

FIG. 3B illustrates example code for inserting box spread data into a database, which may be implemented by the EDCO system of FIG. 1 in accordance with various embodiments disclosed herein.

FIG. 3C illustrates example code for inserting put and call spread data into a database, which may be implemented by the EDCO system of FIG. 1 in accordance with various embodiments disclosed herein.

FIG. 3D illustrates further example code for inserting put and call spread data into a database, which may be implemented by the EDCO system of FIG. 1 in accordance with various embodiments disclosed herein.

FIG. 3E illustrates further example code for inserting put and call spread data into a database, which may be implemented by the EDCO system of FIG. 1 in accordance with various embodiments disclosed herein.

FIG. 4A illustrates a table (Table 8) of values for quoted spread book EDCO provisioning, which may be implemented by the EDCO system of FIG. 1 in accordance with various embodiments disclosed herein.

FIG. 4B illustrates an example database table and code for populating the database table regarding quoted spread book box spread expiration values, which may be implemented by the EDCO system of FIG. 1 in accordance with various embodiments disclosed herein.

FIG. 5 illustrates example code for transmission of Quoted Spread Book (QSB) Symbol reference data over a computer network, which may be implemented by the EDCO system of FIG. 1 in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

An exchange designated complex option (EDCO) is a standard complex instrument as it exists in the current systems supporting complex instruments. Overlaying EDCO functionality onto an exchange will have no impact (i.e., zero additive impact) to existing platform symbol processing.

Figure 1:
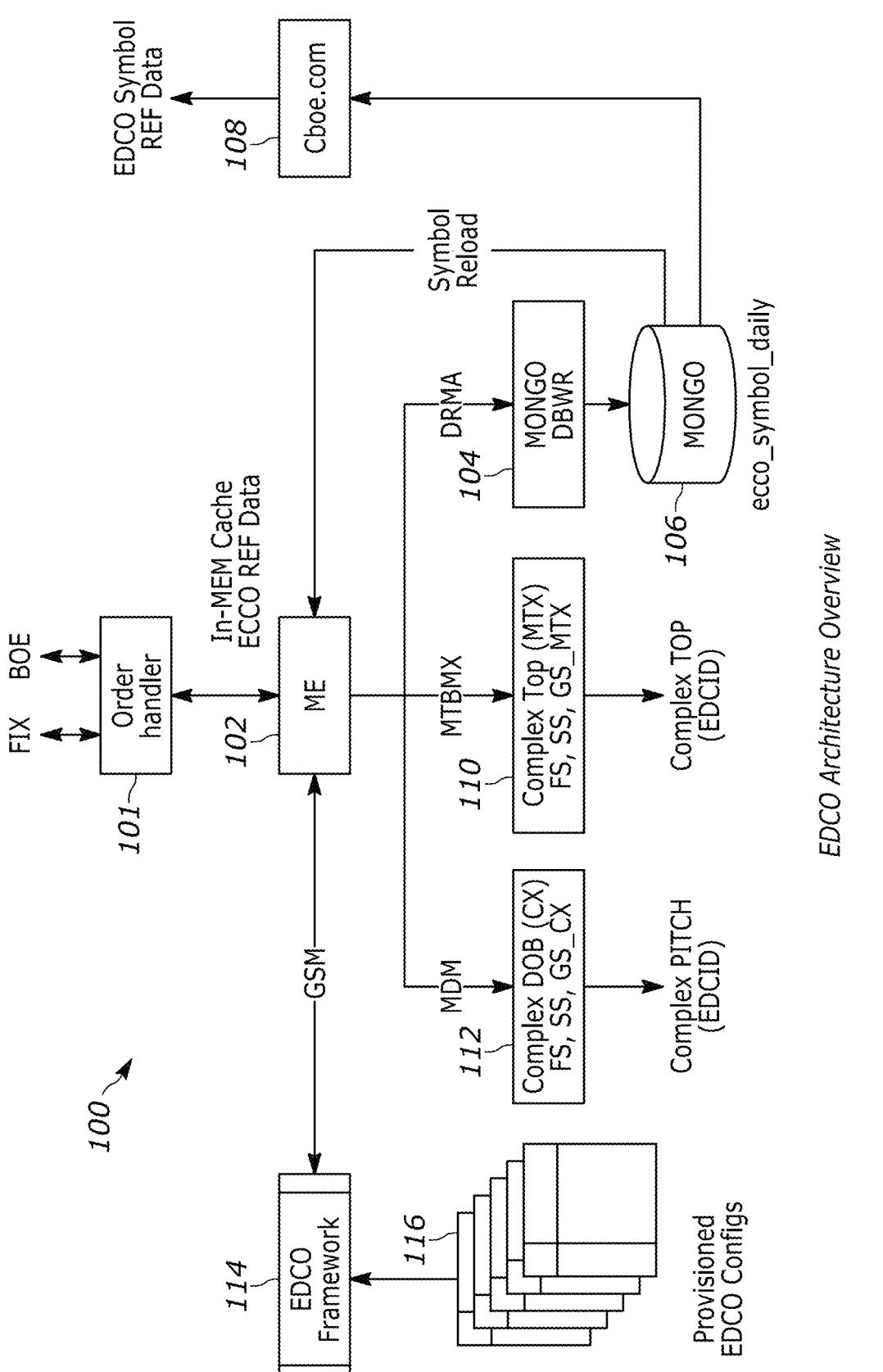
FIG. 1 illustrates an example exchange designated complex option (EDCO) system implementing zero additive impact representations of EDCOs in accordance with various embodiments disclosed herein.

The present disclosure includes improvements in computer functionality or in improvements to other technologies at least because the claims recite that a system (e.g., an exchange designated complex option (EDCO) system 100 of FIG. 1) that implements zero additive impact representations of the plurality of EDCOs have no impact on the system's existing processing implementation or functionality. That is, the present disclosure describes improvements in the functioning of the computer itself or "any other technology or technical field" because overlaying EDCO functionality onto an exchange has no impact to existing platform symbol processing. For example, failure of any aspect of EDCO functionality does not have the possibility of negatively impacting existing exchange symbol processing at any time. Accordingly, no changes to existing symbol processing data model tables, or scheduled jobs are to be made to accommodate EDCOs. The (EDCO) system 100 implements an EDCO framework 114 that accesses a database schema (e.g., including ECDO symbol daily table schema and EDCO template table schema) that enables exchange-created named complex instrument sets (e.g., daily set of EDCOs) to be specified through provisioning only (i.e., no code changes required). In this way, (EDCO) system 100 improves over the prior art exchange systems at least because conventional prior art systems require software code rewrites that require additional compute cycles and memory for implementation of complex instruments on a given exchange platform.

Further, the present disclosure relates to improvement to other technologies or technical fields at least because the EDCO Framework of the EDCO system 100 introduces new complex instrument creation requests to the matching engine using a new matching engine (ME) GSM command (e.g., createEdcoSymbol), which integrates with existing new complex instrument creation functionality that supports FIX/BOE originated new instrument requests. The system 100 is unchanged and/or unimpacted because messaging downstream of the matching engine is unchanged with the minor exception for additional information being communicated to the mongo database writer to populate a new adjunct association table (edco_symbol_daily, e.g., as instantiated from ECDO symbol daily table schema) that maps complex symbols to named EDCO symbol groups and indicates whether allow market makers to rest orders in the associated complex order book (COB) for each EDCO symbol. This reduces computer memory usage, improves efficiency, and generally simplifies system 100 and its execution and memory storage requirements because the no or low downstream messaging has little or no impact on the EDCO system 100, especially when compared to prior art solutions that would require code rewrite and use of additional code and memory resources to implement the same functionality.

In addition, the present disclosure includes applying the certain of the claim elements with, or by use of, a particular machine, e.g., a specialized computing system comprising a computer memory configured to store and implement an EDCO framework having access to an EDCO specification database schema (e.g., including ECDO symbol daily table schema and EDCO template table schema) for defining EDCOs in the exchange platform.

The present disclosure includes effecting a transformation or reduction of a particular article to a different state or thing, e.g., using ECDO symbol daily table schema and EDCO template table schema to create a daily set of EDCOs for an exchange platform.

The present disclosure includes specific features other than what is well-understood, routine, conventional activity in the field, and/or otherwise adds unconventional steps that confine the disclosure to a particular useful application, e.g., EDCO systems and methods implementing zero additive impact representations of EDCOs.

The following describes various aspects of EDCO systems and methods implementing zero additive impact representations of EDCOs.

FIG. 1 illustrates an example exchange designated complex option (EDCO) system 100 implementing zero additive impact representations of EDCOs in accordance with various embodiments disclosed herein. In the example aspect of FIG. 1, system 100 includes one or more server(s), which may comprise one or more computer servers. In various aspects the server(s) of system 100 may comprise multiple servers, which may comprise multiple, redundant, or replicated servers as part of a server farm. In still further aspects, such server(s) may be implemented as cloud-based servers, such as a cloud-based computing platform. In some examples, such server(s) may be proprietary and/or private server(s) hosted by an entity, such as Cboe Exchange, Inc. (referred to herein "Cboe"). Additionally, or alternatively, such server(s) may be any one or more cloud-based platform(s) such as MICROSOFT AZURE, GOOGLE CLOUD, AMAZON AWS, or the like. The server(s) may include one or more processor(s) (CPUs) as well as one or more computer memories.

Each of the one or more server(s) may comprise respective computer memorie(s), such as non-transitory storage medium, which may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others. Such memorie(s) may store an operating system (OS) (e.g., Microsoft Windows, Linux, UNIX, etc.) capable of facilitating the functionalities, apps, methods, or other software as discussed herein. Such memorie(s) may also store computing instructions for implementing any one or more of the algorithms or method(s) as described herein, including as described herein with respect to FIG. 6. In addition, memories may also store machine readable instructions, including any of one or more application(s) (e.g., an application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The computing instructions or applications as described herein may be executed by one or more processor(s) of the server(s) of system 100. The processor(s) may be connected to the memory via a computer bus responsible for transmitting electronic data, data packets, or otherwise electronic signals to and from the processor(s) and memories in order to implement or perform the machine readable instructions, methods, processes, elements or limitations, as illustrated, depicted, or described for the various flowcharts, illustrations, diagrams, figures, and/or other disclosure herein. The processor(s) may interface with memory via the computer bus to execute an operating system (OS). Processor(s) may also interface with the memory via the computer bus to create, read, update, delete, or otherwise access or interact with the data stored in memories and/or a database (e.g., a relational database, such as Oracle, DB2, MySQL, or a NoSQL based database, such as MongoDB). The data stored in memories and/or database may include all or part of any of the data or information described herein.

The server(s) of system 100 may further include a communication component configured to communicate (e.g., send and receive) data via one or more external/network port(s) to one or more networks or local terminals, such as computer network. For example, in some aspects, server(s) of system 100 may include a client-server platform technology such as ASP.NET, Java J2EE, Ruby on Rails, Node.js, a web service or online API, responsive for receiving and responding to electronic requests. The server(s) may implement the client-server platform technology that may interact, via the computer bus, with the memory (including the application(s), component(s), API(s), data, etc. stored therein) and/or a database to implement or perform the machine readable instructions, methods, processes, elements or limitations, as illustrated, depicted, or described for the various flowcharts, illustrations, diagrams, figures, and/or other disclosure herein.

In various aspects, the server(s) of system 100 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to the computer network. In some aspects, computer network may comprise a private network or local area network (LAN). Additionally, or alternatively, computer networks may comprise a public network such as the Internet.

The server(s) of system 100 may further include or implement an operator interface configured to present information to an administrator or operator and/or receive inputs from the administrator or operator. An operator interface may provide a display screen of a local or remote computing device. The server(s) of system 100 may also provide I/O components (e.g., ports, capacitive or resistive touch sensitive input panels, keys, buttons, lights, LEDs), which may be directly accessible via, or attached to, the server(s). According to some aspects, an administrator or operator may access server via a GUI to review information, make changes, and/or perform other functions as described herein.

In general, a computer program or computer based product, application, or code may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) (e.g., working in connection with the respective operating system in memories) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

In some aspects, the server(s) of system 100 may be communicatively connected, via a computer network (e.g., the Internet) to the one or more user computing devices via respective base station(s). In some aspects, a base station may comprise one or more cellular base stations, such as cell towers, communicating to the one or more user computing devices via wireless communications based on any one or more of various mobile phone standards, including NMT, GSM, CDMA, UMMTS, LTE, 5G, or the like. Additionally, or alternatively, a base station may comprise routers, wireless switches, or other such wireless connection points communicating to the one or more user computing devices via wireless communications based on any one or more of various wireless standards, including by non-limiting example, IEEE 802.11a/b/c/g (WIFI), the BLUETOOTH standard, or the like.

In various aspects, any of the one or more user computing devices and/or client devices for accessing and/or communicating with server(s) of the system 100. Such mobile devices may comprise one or more mobile processor(s). In various aspects, user computing devices may comprise a mobile phone (e.g., a cellular phone), a tablet device, a personal data assistance (PDA), or the like, including, by non-limiting example, an APPLE iPhone or iPad device or an ANDROID based mobile phone or tablet.

In various aspects, the one or more user computing devices may implement or execute an operating system (OS) or mobile platform such as APPLE iOS and/or ANDROID operation system. Any of the one or more user computing devices may comprise one or more processors and/or one or more memories for storing, implementing, or executing computing instructions or code, e.g., a mobile application, as described in various aspects herein.

With further reference to FIG. 1, EDCO system 100 comprises an order handler 101 communicatively coupled to an exchange platform and configured to receive requests for exchange designated complex options (EDCOs) and non-EDCO instruments. In various aspects, order handler 101 can be executed (e.g., by one or more processors of the server(s) of system 100) to receive the requests for the EDCOs and non-EDCO instruments. It is to be understood that the exchange platform can be, but need not be, separate from the EDCO system 100. In any event, the EDCO system 100 is communicatively coupled to the exchange platform via a computer network (e.g., the Internet) for exchange of data or information over the computer networking, including exchange data, instrument data, and/or other information to or from the exchange platform, which may comprise, by way of non-limiting example, the Cboe Exchange (C1) platform.

In various aspects, EDCO system 100 may further comprise a matching engine 102 communicatively coupled to the order handler 101 and the exchange platform. The matching engine 102 is configured to match instruments, e.g., such as EDCOs and/or non-EDCO instruments for exchange on the exchange platform. In some aspects, as described in section 2.1 herein, Current Complex Instrument Creation (CIC) functionality (e.g., for the creation of EDCOs) is implemented as either the Cboe Titanium U.S. Options (FIX) and/or Binary Order Entry (BOE) connection messaging or protocol(s) between the customer and the matching engine via order handler order handler 101.

In various aspects, EDCO system 100 may further comprise an ECDO framework 114 communicatively coupled to the matching engine. The EDCO framework 114 has access to provided EDCO configurations or otherwise templates (e.g., provisioned named EDCO templates 116) for generation of ECDOs as described herein.

Still further, the ECDO framework 114 may comprise an EDCO symbol processing engine. The EDCO symbol processing engine is implemented to read EDCO specification data from database schema tables (as described herein) and translate that data into specific complex instruments (e.g., EDCOs).

In various aspects, EDCO system 100 may further comprise a computer memory storing an EDCO template table schema (e.g., EDCO template table schema 220 as shown and described for FIG. 2B herein) defining provisioned named EDCO templates 116 for instantiating zero additive impact representations of each of a plurality of EDCOs for exchange on the exchange platform. As described herein in Section 1.1.5, the zero additive impact representations of the plurality of EDCOs have no impact on the system's existing processing implementation or functionality. In some aspects, each EDCO may be created based on the provisioned named EDCO templates 116, which may be accessed by the accessible by ECDO framework 114.

In various aspects, a memory of the EDCO system 100 may further store an ECDO symbol daily table schema (e.g., ECDO symbol daily table schema 210 as shown and described for FIG. 2A herein) configured to define daily representations of the plurality of EDCOs.

In various aspects, EDCO system 100 may further comprise a daily EDCO symbol database 106 comprising an EDCO symbol daily database table created according to the ECDO symbol daily table schema (e.g., ECDO symbol daily table schema 210 as shown and described for FIG. 2A herein). In various aspects, database 106 may comprise a NOSQL database such as a MONGO database. Database 106 may receive create, read, update, delete (CRUD) commands from matching engine 102 or other computing portion of EDCO system 100. For example, as shown for FIG. 1, database 106 may receive a MONGO database write (DBWR) request 104 (a type of CRUD request) for instantiating or otherwise creating EDCOs in the database, including, for example, the daily set of EDCOs as described herein.

In various aspects, the EDCO symbol daily database table may be reset at a predetermined time, such as reset daily. For example, as described in Section 2.1 herein, an edco_symbol_daily database table of database 106 (e.g., as shown for FIG. 1 and as instantiated according to the ECDO symbol daily table schema 210 as shown and described for FIG. 2A herein) may begin the day empty, and where the matching engine 102 submits a CRUD request (the MONGO DBWR request 104) to create the daily set of EDCOs.

In various aspects, EDCO system 100 may further comprise a server 108 (e.g., a webserver hosting website Cboe.com). Server 108 may provide EDCO symbol reference data and provide or otherwise offer for access over a computer network (e.g., the Internet) a download file (e.g., a JSON formatted file) comprising information for the EDCOs, such as information of the daily set of EDCOs.

Additionally, or alternatively, EDCO system 100 may further comprise one or more data feeds with information of the daily set of EDCOs. Such data feeds may comprise, by way of non-limiting example Cboe's TOP data feed 110 and PITCH data feed 112 for distributing information for the EDCOs, such as information of the daily set of EDCOs.

Further aspects of the EDCO system 100 are described herein in various sections.

1 Overview

A significant fraction traded volume on Cboe options markets results from complex instrument trading. For example, on the Cboe Exchange (C1) as much as 60% of executed volume in SPX results from complex instrument trading. Cboe doesn't try to anticipate the complex instruments that customers will want to trade but instead provides functionality over order entry protocols (Financial Information eXchange (FIX) and Binary Order Entry (BOE)) that customers use to request that a complex instrument be created, or to access the symbol ID of an existing complex instrument, prior to placing an order in the complex instrument. Over FIX, customers can use one-step complex instrument creation using the Long Form New Order Multileg message, or two-step complex instrument creation by first submitting a Security Definition Request message to create a complex instrument (or access the symbol ID associated with an existing complex instrument) followed by submitting an order using the Short Form of the New Order Multileg message. Over BOE, there is only a two-step process in which customers submit a New Complex Instrument message to create a complex instrument (or access the symbol ID associated with an existing complex instrument) followed by submitting an order using the New Complex Order message.

The present disclosure describes Exchange Designated Complex Options (EDCOs). Like the temporary exchange-created complex instruments implemented for the initial phase of CFE OOF, EDCO functionality enables exchange-created complex instruments, but for a different purpose. EDCOs are not a replacement or substitute for customer-driven complex instrument creation (CIC). They exist to support a class of products and services that depend on the existence of certain complex instruments each day. Without EDCOs this class of products and services would not be possible since they would be dependent on customers having created the required complex instruments. As a result, EDCOs are an adjunct to customer-driven CIC rather than a replacement. It is to be understood that when the term "product" or "service" is used herein, it refers to computer software or code, which can be computer software or code-based products and/or services as the case may be.

Another important distinction is that some products and services that depend on the availability of certain complex instruments also require that market makers be allowed to rest orders in the complex order book (COB). Currently, market makers are not allowed to rest orders in SPX/SPXW COBs in regular trading hours (RTH). The EDCO system implementation, however, includes functionality that enables select complex instruments to allow market makers to rest orders in the COB during RTH.

The first Cboe product that depends on EDCO functionality is called Cboe Quoted Spreadbook (QSB). The initial EDCO provisioning of the QSB complex instruments is presented herein.

Products and services other than QSB are also described herein that make use of EDCO functionality.

1.1 Key Requirements and Design Considerations

The following aspects were factored into the current design.

1.1.1 An EDCO is a Standard Complex Instrument

An EDCO is a standard complex instrument as it exists in the current systems supporting complex instruments (C1, C2 and EDGX exchanges). A difference is that EDCO complex instruments are guaranteed to exist, and their symbol IDs are made available to customers prior to the start of regular hours trading. All aspects of complex instrument behavior, including risk management/QRM, auction eligibility, fees and billing, etc. are the same whether a complex instrument was created as a result of a customer request or as a result of EDCO processing.

1.1.2 Applicable to Proprietary and Multilist Options on C1, C2 and EDGX Exchanges EDCOs can be created for proprietary index options (both GTH-enabled and RTH-only), and multilist options on exchanges (e.g., such as Cboe Exchanges) that support complex instruments, which includes, by way of non-limiting example, C1, C2 and EDGX exchanges. Operational differences can be considered when deploying EDCOs on the C1 exchange vs C2 and EDGX. Global Trading Hours (GTH) are available on C1 for certain classes, whereas GTH is not available on C2 and EDGX for any options class. On C1, EDCO complex instrument processing can be scheduled at any time after the start of GTH for any class as all matching engine processes are running and accepting messages, which includes GTH and non-GTH proprietary as well as multilist. However, on C2 and EDGX, matching engine processes do not start until approximately 6:40 am ET (i.e., nearly an hour prior to the start of RTH queuing period, which is 7:30 am ET), and as a result, EDCO complex instrument creation must be scheduled between 6:40 am ET and the RTH opening.

1.1.3 EDCOs on C1 are an RTH-Focused Functionality

On the C1 exchange, market makers are allowed to rest order on all COBs in GTH, so the EDCO functionality in which complex instruments can be created with the ability for market makers to rest orders in the COB applies only to RTH as they are already allowed to rest orders in all COBs in GTH. In some aspects, EDCO-depending products and services will apply to RTH trading only. Without this requirement, all associated EDCO symbol processing would need to be completed prior to the start of the GTH session. The DPE symbol processing SMEs concluded that is a non-starter on the Cboe Exchange. As a result, the design involves EDCO creation of complex instruments any time during GTH. Section 1.1.8 below includes a related explanation of why the architecture choice of an ME exposed GSM for EDCO symbol creation is implemented.

1.1.4 Extensibility and Support for Multiple Dependent Services

The EDCO system accommodates pre-created complex instruments on behalf of multiple products and services. Quoted Spreadbook (QSB) is a first dependent service that uses the EDCO system as described herein.

The systems and methods herein allow multiple EDCO sets to define potentially overlapping sets of complex instruments (i.e., one complex instrument can be a member of multiple EDCO sets). Existing EDCO sets can be easily updated to support the evolution of products once launched and to facilitate troubleshooting and problem resolution. Maintenance of EDCO set specification is largely provisioning without requiring code changes (except to accommodate new strike analytics plug-ins as described later in this document).

1.1.5 No Impact to Existing Symbol Processing

Overlaying EDCO functionality onto an exchange will have no impact to existing platform symbol processing. For example, failure of any aspect of EDCO functionality should not have the possibility of negatively impacting existing exchange symbol processing at any time. Accordingly, no changes to existing symbol processing data model tables, or scheduled jobs are to be made to accommodate EDCOs.

1.1.6 Coexistence with Complex Instrument Creation (CIC)

EDCOs will not affect the current CIC functionality used by customers over FIX and BOE. Customers will continue to use one-step and two-step CIC functionality with no restrictions or changes. The only difference that customers will encounter is that select complex instruments may already be in existence (i.e., have been created by EDCO processing). To the customer, there is no difference between a complex instrument already in existence resulting from another customer having created the same instrument earlier in the trading day or if the instrument was created by EDCO symbol processing.

Conversely, EDCO functionality must account for the possibility that at the time of EDCO processing, a complex instrument may have already been created in response to a customer CIC request. EDCO symbol processing will be scheduled after the exchange has started and prior to the start of the RTH session. During this time, matching engines (ME)s are alive and can process GSM commands. Customer may submit CIC requests that arrive prior to scheduled EDCO symbol processing. The disclosure takes this into account—if EDCO symbol processing encounters a complex instrument that has already been created, the result of EDCO processing is to insert record into the EDCO symbol association database table (e.g., an edco_symbol_daily database table) and to signal to data feed and spin servers for the dissemination of Exchange Designated Complex Instrument Definition (EDCID) messages.

1.1.7 Maximum Reuse of Existing CIC System Functionality

CIC functionality is implemented by directing inbound instrument creation FIX and BOE messages to the matching engine (ME) associated with the requested symbol. The ME handles the details of instrument creation, messaging upstream to an order handler as necessary to send an acknowledgment (ack) back the customer, as well as "Instrument Accepted" messaging to downstream processes. Downstream of the matching engine, market data processes use Instrument Accepted messages associated with new complex instruments to update the instrument definition messages going out PITCH and TOP protocols. Downstream of the ME the mongo database writer updates symbol processing tables (e.g., symbol_daily, symbol_live and complex_symbol_legs_live, etc. database tables).

An EDCO is configured to leverage as much of the existing symbol creation infrastructure as possible. To accomplish this goal, a new ME GSM command is created specifically for EDCO creation. The DPE EDCO symbol creation engine that runs prior to the start of the RTH session will invoke the GSM command for each complex instrument to be created. The ME GSM command implementation introduces the new complex instrument creation request on behalf of the EDCO symbol processing engine in such a way that handling a request for a new complex symbol from the EDCO symbol processing engine is the same as handling a customer request, with reuse of the logic that validates the request, detects whether the instrument is already in existence, etc. The exception with EDCO request handling via the GSM command is that there is no customer on the other end of a FIX or BOE connection to which to send an acknowledgement. Existing CIC handling ME logic is reused with all associated downstream consumers seeing the same messaging that exists pre-EDCO (e.g., sequenced Complex Instrument Definition message sent on creation of a new complex instrument, followed by inclusion in the background loop). In addition to standard messaging, a wire message is created that is used by a database writer (e.g., a MONGO database writer) to update the ECDO symbol association table and data feed and spin servers for dissemination of Exchange Designated Complex Instrument Definition messages.

1.1.8 why Use CIC GSM Rather than Standard DPE Symbol Processing?

In this section we will pre-answer the obvious question— "why introduce a GSM command for complex instrument creation and not integrate EDCO symbol processing into standard DPE symbol processing that occurs between system shutdown and when the system starts back up for the next trading session?" The reasoning is multifaceted. First, the first service that will be launched that requires EDCOs is Quoted Spreadbook. It requires SPX/SPXW complex instruments only and is thus a C1 exchange focused service. On C1 existing symbol processing takes place in a finite time window that is currently experiencing timing challenges. The stored procedure complex_symbol_ref_data already is long running and times out on occasion. Adding EDCO processing would exacerbate that situation. Second, the available time between C1 system shutdown, existing DPE symbol processing and the start of GTH into which EDCO processing would have to be inserted in finite. There are scalability concerns if use of EDCOs grew to the extent that they might, based on contemplated new dependent products and services. Third, Integrating EDCO processing into standard DPE pre-startup symbol processing would introduce the possibility of EDCO processing disrupting or otherwise causing issues in standard symbol processing. Consistent with the above stated goal of "No impact to existing symbol processing", avoiding standard symbol processing dependency on EDCOs is preferred. Finally, by using a ME GSM command-based approach after system startup to "register" and "create as necessary" (if not already created) EDCOs, we are effectively introducing a complex instrument creation request into the same processing workflow that occurs today for FIX/BOE introduced new complex instrument requests, which creates the possibility of introducing EDCOs with no impact to current symbol processing on C1 other than to record association of complex instrument symbols with EDCO types (i.e., associated Cboe product and services) and to instruct the ME for which complex symbols to allow market makers to rest orders in the COB in RTH (market makers can already rest orders in COBs in GTH on C1).

1.1.9 EDCOs and Resting GTC Orders

Each day the EDCO symbol creation process creates every provisioned EDCO complex instrument by invoking the ME GSM. This includes EDCO symbols that may have been carried forward from the previous date as a result of resting GTC orders.

The standard symbol processing that carries forward complex symbols from the previous date resulting from resting GTC orders applies unchanged. As a result, if a prior day complex symbol with resting GTC orders is carried forward, it's EDCO-ness is not carried forward with it. When the EDCO symbol creation process invokes the GSM command to create a complex instrument that happens to have been carried forward, the EDCO set membership of that carried forward is reestablished through the EDCO processing described in this document. The same design approach establishes EDCO set membership to complex instruments that may have been created by customers before EDCO processing runs.

1.1.10 Recovering from EDCO Processing Issues

If EDCO symbol processing problems are encountered, errors are no more severe than a customer having submitted CIC requests by accident. In one scenario, incorrect complex instruments may have been created due to an uncaught provisioning error. In this scenario, the provisioning defect would be corrected and EDCO symbol processing would be rerun in its entirety. EDCO symbol processing is intentionally idempotent which enables this simplified error recovery scenario.

In another failure scenario, a processing issue such as a framework exception results in an incomplete EDCO set being created. Again, the idempotent design enables the EDCO symbol processing to be re-run in its entirety after the problem is identified and resolved.

If EDCO processing errors are discovered after the RTH trading session has begun, EDCO processing can be re-run intraday safely. Addressing EDCO symbol processing issues can comprise fixing the problem intraday only if deemed severe or resolving discovered issues for the next trading session.

1.1.11 EDCO Symbol Reference Data Access and Dissemination

Customers that need access to symbols comprising the EDCO symbol universe include market makers that will make markets in the EDCO symbols in RTH, brokerage platforms that will implement specialized trading interfaces and filters to access the quoted subset of the complex instrument universe, and customers that use brokerage platforms and/or direct exchange connections vie FIX or BOE to place orders specifically in EDCO quoted instruments. In all cases, the symbol IDS of EDCO instruments is made available for electronic discovery or access prior to the start of RTH.

Two methods of accessing EDCO symbol reference data prior to the start of RTH are provided: 1) Cboe.com Reference Data web page, and 2) over PITCH and TOP data feeds and spin server interfaces.

Users (e.g., customers) can access a JSON formatted file from reference data page of a web page, e.g., the Cboe Exchange website. The format of the JSON file provides the same information as the new Exchange Designated Complex Instrument Definition message described below, which comprises standard complex instrument definition information as well as the EDCO set membership information.

Some customers prefer not to or do not support internet access from dependent systems. These customers will access EDCO symbol reference data over Complex PITCH and TOP data feeds using the new Exchange Designated Complex Instrument Definition (EDCID) message.

1.1.12 Floor System Changes to Allow EDCO Symbol Orders Routed to the Floor to be Booked Prior to EDCOs, market maker capacity orders (M or N) for complex SPX complex instruments that are routed to the floor could not be sent back to the matching engine to rest in the electronic order book in RTH. This is because prior to EDCOs market makers could not rest orders in any complex SPX symbol order books in RTH. With the introduction of EDCOs, changes are made to the interface with the floor systems so that M or N capacity orders for complex SPX complex instruments that are EDCOs are sent back to the matching engine to rest in the electronic order book.

2 EDCO Architecture 2.1 EDCO Architecture Overview

As shown and described for FIG. 1, a new EDCO architecture is provided herein. Complex Instrument Creation (CIC) functionality can be implemented as connection messaging (e.g., as FIX/BOE connection messaging) between a user and the matching engine 102 via an order handler 101. EDCO Framework 114 introduces new complex instrument creation requests to the matching engine 102 using a new matching engine (ME) GSM command (e.g., createEdcoSymbol), which integrates with existing new complex instrument creation functionality that supports FIX/BOE originated new instrument requests. The system is unchanged and/or unimpacted because messaging downstream of the matching engine 102 is unchanged except for additional information being communicated to the mongo database writer 104 to populate a new adjunct association table (edco_symbol_daily, e.g., as instantiated from ECDO symbol daily table schema 210) that maps complex symbols to named EDCO symbol groups and indicates whether allow market makers to rest orders in the associated complex order book (COB) for each EDCO symbol.

The EDCO Framework 114 comprises a database schema (e.g., including ECDO symbol daily table schema 210 and EDCO template table schema 220) configured to enable addition of named complex instrument sets for allowing future product and service integration with the existing system with zero additive impact on system 100. New EDCO instrument sets can be added or provisioned by updating the database table derived from the database schema.

Each trading day, the EDCO symbol processing engine reads EDCO specification data from the schema and translates that data into specific complex instruments to be designated. The EDCO engine invokes the new ME GSM command for each complex instrument to be designated. The design of the EDCO framework database schema for provisioning named EDCO sets is presented in a separate section of this document.

When the EDCO framework invokes the matching engine GSM command to designate a complex instrument, GSM arguments specify EDCO type information and an indicator of whether to allow market makers to rest orders in the COB associated with the instrument. At the time the GSM is called, a customer may have already created the same instrument using CIC functionality on FIX/BOE. The same is true for customer initiated complex instrument creation over FIX/BOE (i.e., the instrument being requested by a customer may have already been created by another customer).

When the ME GSM command is invoked the matching engine 102 updates an in-memory cache that is used by the matching engine 102 to determine whether to allow market makers to rest orders on a complex instrument COB. This occurs regardless of whether the complex instrument existed prior to the GSM call. The same in-memory cache is populated when a symbol load/reload operation is performed using a new EDCO system table edco_symbol_daily, which maps a complex symbol ID to EDCO type information and includes a field indicating whether to allow market makers to rest orders in the COB.

When the GSM command is used to create an EDCO complex instrument, regardless of whether the complex instrument already existed, EDCO metadata is carried to the mongo database writer (mongo dbwr) 104 in a new appendage on the existing Instrument Accepted wire message. The EDCO metadata to be shuttled to the mongo dbwr is provided as arguments to the GSM command and is used by the database writer to populate the edco_symbol_daily database table (Table 1) as described for the scheme of FIG. 2A, the ECDO symbol daily table schema 210, and as stored in database 106 as shown for FIG. 1.

The edco_symbol_daily database table is an adjunct symbol association table, implemented as a daily dated table, that does not affect existing symbol processing in any way. The same complex instrument symbol can appear in multiple edco_symbol_daily records (i.e., may exist in multiple EDCO instrument sets). Further, the same complex instrument can appear in multiple EDCO instrument sets with one record indicating market makers are allowed to rest orders and another for the same instrument indicating to not allow market makers to rest orders. This is expected behavior. Such a symbol will allow market makers to rest orders (i.e., the EDCO indicating market makers can rest orders takes precedence).

In various aspects, the edco_symbol_daily database table starts the day empty (e.g., includes no records). A new record is entered by the mongo database writer (e.g., via MONGO DBWR 104) for each time the matching engine GSM command is invoked by the EDCO symbol processing engine. Similarly, the matching engine in-memory cache is updated each time the GSM command is invoked. The matching engine in-memory cache only needs to store complex symbol IDs for which market makers are allowed to rest orders. If the same complex system is requested multiple times via the GSM as a result of duplicates in multiple EDCO sets, the matching engine only needs to record which complex instruments have at least one creation request with an argument indicating to allow market makers to rest orders (i.e., a single creation request with allow market makers to rest set to true overrides other requests with allow market makers to rest set to false).

The matching engine reload symbols functionality can be updated to repopulate the in-memory cache of complex instruments to allow markets to rest by fetching all edco_symbol_daily database table records and creating an in-memory cache record for each symbol mapped to the associated matching unit and that has at least one record indicating to allow market makers to rest orders. In some aspects, there can be a race condition with symbol reload. EDCO symbol ref data could be in-flight to the MONGO DBWR (e.g., MONGO DBWR 104) at the time of the symbol reload. As a result, the state of the in-memory cache of EDCO symbol reference data can be joined with the data loaded from edco_symbol_daily database table to address this edge case.

Customers require the ability to discover which complex instruments are members of Exchange Designated Complex Options sets, prior to the start of the RTH session. Two methods are provided for ECDO symbol discovery: 1) a JSON formatted file accessible form the Cboe.com reference data page, and 2) Exchange Designated Complex Instrument Definition messages received over Complex PITCH and TOP data feeds in real time, background loop and spin request responses.

The Cboe.com server (e.g., server 108) reference data accessible file JSON formatted file contains lists of EDCO definition including symbol ID, leg symbol IDs and EDCO type and subtype information. It is constructed from the contents of the edco_symbol_daily complex symbol ID and EDCO type and subtype information, and leg information sourced by joining on the complex instrument symbol ID with complex_symbol_legs_live and symbol_live database tables.

Customers also have the option to access EDCO symbol reference data over the Complex PITCH and TOP data feeds (e.g., feeds 110 and 112). A new supplemental message—Exchange Designated Complex Instrument Definition (EDCID)—is sent as a sequenced and unsequenced (background loop) message as association data that customers can use to identify which of the complex instruments disseminated as Complex Instrument Definition messages are EDCOs and their EDCO type and subtype association. Complex instrument leg definitions are discovered using the symbol IDs in the EDCID messages cross-referenced to Symbol Mapping messages for OSI symbol detail.

2.2 EDCO System Implementation

This section describes new system elements and changes to existing subsystems that comprises EDCO implementation.

2.2.1 DPE EDCO Database Schema Implementation

The EDCO specification database schema (e.g., including ECDO symbol daily table schema 210 and EDCO template table schema 220) is implemented comprising database tables (e.g., the postgreSQL tables specified in section 3.1 of this document). In addition to the EDCO specification tables, the complex instrument association table written by the mongo database writer are implemented as a daily dated postgreSQL table.

2.2.2 DPE EDCO Framework

A core aspect of the EDCO framework is a Domain Specific Language (DSL) and an interpreter that processes DSL specification of complex instrument sets into instructions for instrument creation. The DSL is implemented as a set of EDCO database tables (e.g., PostgreSQL tables) (described in Section 3 of this document) that enable the specification of named complex instrument sets to be created on behalf of multiple products and services that require the existence of specific complex instruments. For example, a simple product may require a small number of vertical call spreads and vertical put spreads on select expirations of an option class. Another more complicated example might be a service that exposes the ability to manage delta by rolling combos (i.e. put and call at the same strike and opposite side) from one expiration to another using calendar spreads across a range of strikes (i.e., Jelly Rolls).

Named EDCO sets are created through provisioning the EDCO schema (e.g., including ECDO symbol daily table schema 210 and EDCO template table schema 220). One minor code change may comprise a C++ where the EDCO types and subtypes are hardcoded into an enumeration data structure (enum) rather than represented as strings (for maintainability and security reasons).

Complex instrument strikes can be specified as constant values (e.g., Box Spreads), or they can be specified using function plugins that implement various conditional strike analytics. Examples include computing an anchor strike using a put-call implied forward level rounded to a nearest increment. In some aspects, the EDCO framework 114 can be extended to incorporate new parameterized strike selection algorithm by adding new named strike algorithm plugins that take named algorithm-specific parameters.

The EDCO complex symbol processing engine (also referred to herein as the EDCO engine) is scheduled to run at a specific time depending on the exchange (e.g., post GTH start on C1 or post RTH queuing period start on C2 and EDGX). The EDCO engine reads configuration data from the EDCO schema and creates all specified complex instruments via calls to a new matching engine instrument creation GSM command designed to emulate CIC functionality available to customers over FIX and BOE, but the "customer" in this case is the EDCO engine.

2.2.3 ME Changes 2.2.3.1 EDCO Creation GSM Command

A new ME GSM command (e.g., createEdcoSymbol) is used by the EDCO engine to create complex instruments. The GSM command arguments include the following (1) EDCO type (e.g., "QSB"); (2) EDCO subtype (e.g., "JELLY_ROLL"); (3) Allow market maker rest flag; and (4) Leg information including symbol id, ratio and side.

Customers using FIX and BOE functionality to create complex instrument receive a response containing the Cboe symbol of the requested instrument. Similarly, the GSM response will include the Cboe symbol ID of the requested instrument. For the same reasons that FIX and BOE instrument definition requests can be rejected, instrument request submitted via the GSM can be rejected (e.g., invalid leg ratio, inconsistent underlying product, etc.). The EDCO engine will be implemented such that leg ordering will always comply with leg ordering rules specified in the US options complex book process, and cross product complex instruments will not be allowed. Cross OSI root spreads will be allowed as long as they correspond to the same underlying product—e.g., SPX/SPXW.

Customers using FIX and BOE functionality to create complex instruments may request a symbol that has already been created by a prior request. In this case, the customer receives a successful response that includes the previously created symbol ID. The same occurs with the GSM command; if a complex instrument already exists at the time of the GSM call, the symbol id of the preexisting complex instrument is returned.

2.2.3.2 EDCO Symbol Reference Data in-Memory Cache

The matching engine implements a new in-memory cache of EDCO reference data as required to determine whether to allow market makers to rest orders in a complex instrument COB. The cache is a fast lookup set of complex symbol ids for which market makers are allowed to rest orders. Each time that the GSM command to create a new complex instrument is invoked by the EDCO engine, the matching engine performs an operation to update the in-memory cache. The same complex instrument can be requested by the EDCO engine as part of multiple named sets. The same complex instrument can be specified to allow market makers to rest order in one request, and to not allow market makers to request in another request. If one or more requests indicates to allow market makers to rest orders, the matching engine will allow market makers to rest orders, ignoring the request that indicates not to allow market makers to rest orders. In other words, market maker resting takes precedence.

The symbol reload operation is implemented to repopulate the EDCO reference data in-memory cache using the contents of the edco_symbol_daily database table. As a result of downstream processing associated with each GSM command call, the edco_symbol_daily database table contains a record of every EDCO, it's type information and a flag indicating whether to allow market makers to rest orders (see Table 1 of FIG. 2A). The symbol reload operation iterate over edco_symbol_daily records and add an entry to the in-memory cache for each symbol hosted on the matching unit for which one or more records indicates to allow market makers to rest orders.

2.2.3.3 EDCO Reference Data Included in Downstream Wire Messaging

When the GSM is invoked by the EDCO engine, a record ultimately appears in the edco_symbol_daily database table that comprises a map of all complex instrument symbols associated with an EDCO type and subtype and whether to allow market makers to rest orders in the COB. Records in this table are written by the mongo database writer (changes described below). To enable the database writer to update the edco_symbol_daily database table, EDCO reference data is added to Instrument Accepted wire message (EDCO appendage) that results from the EDCO engine symbol processing engine invoking the new ME instrument creation GSM command.

2.2.4 Mongo Database Writer Changes

The mongo database writer (MDBWR) (e.g., via MONGO DBWR 104) is configured to populate the edco_symbol_daily database table with a record associated with each EDCO symbol creation engine call to the new matching engine symbol creation GSM command. The result of each GSM call is an Instrument Accepted message with a new EDCO appendage that carries EDCO type and subtype association information that is used by the MDBWR (e.g., via MONGO DBWR 104) to add edco_symbol_daily records associated with each EDCO.

2.2.5 Complex PITCH and TOP Data Feed and Spin Server Changes

Users require the ability to discover which complex instruments are members of Exchange Designated Complex Options sets. System 100 provides at least two methods for ECDO symbol discovery. A JSON formatted file can be accessible form the Cboe.com (e.g., server 108). Additionally, or alternatively, exchange designated complex instrument definition messages can be sent and received over complex PITCH (112) and TOP (110) data feeds in real time for receipt and processing by user computing devices.

2.2.6 Changes Associated with Related Floor Systems Functionality

With the introduction of EDCOs changes are made to the interface with the floor systems so that M or N capacity orders for complex SPX complex instruments that are EDCOs are sent back to the matching engine to rest in the electronic order book. Such changes accommodate related floor systems functionality to handle routed complex orders on EDCO for which market makers are allowed to rest orders in the COB during RTH.

2.2.7 Web Functionality to Expose EDCO Symbol Reference Data

Customers using Cboe products that depend on EDCO technology will be directed to endpoints on Cboe.com (e.g., server 108) to access symbol reference data applicable to the product. For example, a link can be created on the C1 reference data page for the Quoted Spreadbook product with a label "Quoted Spreadbook series (JSON)." The link accesses web functionality that reads the edco_symbol_daily database table, selects all records associated with Quoted Spreadbook product (e.g., edco_type="QSB") then creates and returns a JSON file that contains each QSB associated complex symbol and its constituent leg information formed by joining edco_symbol_daily with the complex_symbol_legs_live table.

2.2.8 Floor Interface Changes to Carry EDCO Metadata with Floor Routed Orders

On receipt of a complex order on an EDCO symbol that is being routed to the floor, the Instrument Accepted (ZA) message that is always passed with routed orders is to contain the EDCO appendage. The Floor Order Gateway (FLOG) that receives the message then makes the EDCO portions of the complex symbol accessible to support changes made in the interface between PAR and the FLOG (Hazelcast distributed data structure). With this change, the distributed data structure will now contain the allow_mm_rest flag associated with EDCO, which can be used to enable functionality in PAR to selectively allow market maker capacity orders in EDCO symbols to be booked back to the electronic order book, whereas previously no market maker capacity orders in any complex SPX symbols could be booked.

3 EDCO Framework

A main aspect of the EDCO framework 114 is a database schema (e.g., including ECDO symbol daily table schema 210 and EDCO template table schema 220) that enables exchange created named complex instrument sets (e.g., daily set of EDCOs) to be specified through provisioning only (i.e., no code changes required).

In some aspects, the EDCO framework 114 includes constant strike values and strike values computed as a rounded put-call parity implied forward level. In some aspects, new EDCO instrument sets (e.g., a daily set of EDCOs) that require strike specification analytics not currently present in the EDCO framework may be implemented by an EDCO strike analytics plugin that extends the available strike analytics data provided for to EDCO sets.

The schema described herein (e.g., including ECDO symbol daily table schema 210 and EDCO template table schema 220) can be considered a Domain Specific Language (DSL) for specifying EDCO symbol sets. The DSL supports a universe of possible set specifications that can be implemented in order to define a one or more various types of EDCOs and EDCO dependent products.

The DSL provides a top-down implementation framework starting with EDCO templates (e.g., provisioned named EDCO templates 116 as defined by the EDCO template table schema (e.g., EDCO template table schema 220 as described herein for FIG. 2B) and working down to template instance specifications including constant and contingent strike specifications, expiration specifications and other features designed to address more complicated EDCO set requirements.

Aspects of the EDCO engine operation are presented such as processing scheduling, logging and functional requirements including handling complex instrument definitions containing unlisted expirations and strikes.

In addition, in this section, hypothetical provisioning examples are presented to demonstrate EDCO framework features.

3.1 EDCO Schema Description 3.1.1 EDCO Templates

Computing systems that implement the EDCO framework to pre-create a set of complex instruments (e.g., a daily set of EDCOs) are associated with one or more EDCO templates. Each EDCO template is defined as a single record in the edco_templates table shown in (e.g., EDCO template table schema 220 as described herein for FIG. 2B). For example, as shown in the EDCO template table schema 220 (Table 2) of FIG. 2B, each EDCO template associated with a Cboe product implementing EDCO share the same edco_type field. A Cboe product can define multiple EDCO subtypes as appropriate. For example, the QSB product can define subtypes BOX SPREAD, BOX SPREAD ROLL and JELLY ROLL.

The allow_mm_rest field indicates to the matching engine 102 whether to allow market makers to rest orders in the one or more complex instruments associated with the template. Strike range expansion is implemented with the three fields strike_min_incr_cnt, strike_max_incr_cnt and strike_incr_value. Templates that do not require strike range expansion can use the value of zero for strike_min_incr_cnt and strike_max_incr_cnt. For templates the require strike range expansion, after the base complex instrument associated with each template instance is created, the instrument can be replicated one or more times with all specified strikes incremented as specified by the strike range expansion arguments in the template. For example, if a template instance defined a vertical call spread comprising a long at-the-money (ATM) call and a short call with a strike $25 higher than the ATM strike, and a range of OTM call spreads was required spaced at $25, the strike range expansion parameters might be set to strike_min_incr_cnt=0, strike_max_incr_cnt=10 and strike_incr_value=25. Note that an increment count of zero can be always skipped by the EDCO symbol processing engine as it would generate an exact copy of the associated template instance complex instrument.

In some aspects, a strike range expansion field can be implemented in the edco_templates table to constrain the strike range expansion to be uniform across the expirations represented in the EDCO set defined by the template. This implementation simplifies the specification of EDCO sets. Alternatively, the three strike range expansion fields can be placed in each edco_template_instances table record, which can be replicated for a vast majority of EDCO sets. Most sets that don't require strike range expansion would include three zero values in every template instance value. Still further, if a given EDCO set requires fan out values with time to expiration or other such variable strike range expansion with expiration, the strike range expansion fields can be moved to the instances table with associated EDCO engine changes and existing data migration can be performed for such cases.

3.1.2 EDCO Template Instances

Associated with each EDCO template are one or more template instances, each of which are defined by one entry in the edco_template_instances table 230 shown in Table 3 of FIG. 2C. Each template instance entry represents a single complex instrument, which may be strike range expanded based on strike range expansion fields in the associated EDCO Template.

As shown for FIG. 2C, The begin_dt and end_dt fields are Cboe standard fields used for scheduling activation or deactivation of provisioned data to align with trade desk notice announcements. The instance_id and leg_id values define the legs of a template instance (i.e., a complex instrument definition). Each leg of a complex instrument can require specification of the OSI root, expiration date, strike, put or call, ratio and side (buy or sell) specified in fields of the edco_template_instances table.

Leg expiration dates are specified by referencing expiration config entries with foreign keys into the edco_expire_configs table 240 described herein in Table 4 of FIG. 2D herein. A vertical complex instrument requires only a single expiration date, which would reference an edco_expire_config entry with a sequence value of 1. A calendar spread complex instrument requires multiple expiration dates, which would reference an edco_expire_config entry name with multiple sequence values (e.g., 1 and 2 for a two-expiration complex structure).

Leg strike prices are specified by referencing a strike config entry with foreign key into the edco_strike_configs table described herein in 6 of FIG. 2F. Complex instruments with multiple strikes are typically specified with an anchor strike specified with a foreign key into the edco_strike_config table and an offset. For example, strikes for two legs of a 25 wide vertical call spread could be specified with one leg referencing an edco_strike_configs entry and a zero offset, and the other leg referencing the same edco_strike_configs entry and an offset value of 25.

3.1.3 EDCO Expiration Configs

Since EDCO specified complex instruments are created each trading day throughout the calendar year, specification of expiration dates uses nearby values. An expiration date to be used for a leg is specified by referencing an expire config name foreign key into the edco_expire_configs table shown in Table 4 of FIG. 2D, which in turn references a named calendar entry in the edco_calendars_table shown in Table 5 of FIG. 2E enabling mapping of nearby values to concrete expiration dates based on the current trading date.

The expire_adv field of the edco_expire_config table enables referencing nearby contracts from a reference date that is advanced an arbitrary number of trading days. This allows the framework to effectively implement offset calendars, or to pre-roll contracts. One example that makes use of this functionality to specify expiration dates that aligns with the convention of "lead quarterly contract," which corresponds to the standard quarterly contract expiration on a trading date that is advanced by a specified number of trading dates.

In some aspects, expirations for calendar spread complex instruments can be specified using a single expire_name with distinct expire sequence values so that the set of multiple expiration dates can be evaluated and validated as a single entity. This can enable a key but subtle aspect of EDCO engine processing. Some EDCO sets will involve expire configs that are only valid during certain parts of the calendar year. Considering the multiple expiration dates of a spread instrument as a single unit enables pre-validation of the expire config and skipping of instrument creation when the config is invalid. For a multiple sequence expire config entry to be valid the resolved expirations dates must be strictly increasing in order of expire sequence. For example, consider a calendar spread configured with nearby expirations 1) second nearby standard contract, and 2) next quarterly contract. At some point during calendar October, the second nearby standard contract will be a December expiration and the next nearby quarterly expiration will also be the same December expiration. Since the resolved expiration dates are not strictly increasing with expire sequence (in this case they are equal), the framework would consider this expire config as invalid and the complex instrument associated with this template instance on this day would be skipped. Similarly, at some point during calendar November, the second nearby standard contract will be a January expiration and the next nearby quarterly will be a December expiration. In this case, the first in the sequence maps to an expiration date that is later than the second expiration date. The framework would consider this expire config as invalid and the complex instrument associated with the template instance on this date would be skipped as a result.

In some aspects, when specifying an expiration configuration, a nearby specification can result in a date that is not a valid expiration date. For example, an expiration configuration might extend past the end of the currently listed contracts. In the case where the date resulting from the expire config evaluation is not a valid expiration date and the date is not an exchange holiday, the expiry config can be considered invalid and any template instance referencing the expire config will be skipped.

Exchange holidays require specific handling for each expire type. For example, the expire type of 'standard' will decrement by one trading day when the third Friday lands on an exchange holiday. The expire type of 'daily' on the other hand will advance forward. Consider the case of a 0DTE to 1DTE roll where tomorrow is an exchange holiday. If the current date is a Monday but Tuesday is an exchange holiday, the desired behavior would be for the 0DTE to 1DTE roll to adapt around the holiday to roll Monday to Wednesday. EDCO software that requires EDCOs may implement custom desired behaviors to adapt around exchange holiday. In such cases, the framework can define new expire type value and associate them with the new expire type custom exchange holiday handling logic.

3.1.4 EDCO Strike Configs

Template instance leg strike prices can be specified as hard-coded constant values or using strike algorithm plugins that are implemented in the EDCO framework. The edco_strike_configs table 260 shown in Table 6 of FIG. 2F and enables specification of constant strike values by setting the strike_type field to "CONST" and specifying the constant numeric strike value in the strike_value field. When using strike algorithm plugins, the strike_type is set to a predefined string value that references the strike algorithm (e.g., "FORWARD") and the strike_value field is set to NULL.

When using strike algorithm plugins to specify a leg strike, the arguments to the name strike algorithm are specified in the edco_strike_config_args table 270 shown in Table 7 of FIG. 2G.

In some aspects, each available strike algorithm plugin can require algorithm-specific named arguments, which are provided to an algorithm abstract method implementation which parses and casts text arguments as necessary. For example, the strike algorithm named "FORWARD", requires three arguments named OSI_ROOT, EXPIRY, and ROUND_INCR. The FORWARD algorithm implementation analyzes the prior date indicative settlement prices for the options for the specified OSI_ROOT and expiration to compute a put-call parity implied forward price, that rounds that price to the nearest ROUND_INCR. The OSI_ROOT argument must correspond to a valid OSI root (e.g., "SPX"). The ROUND_INCR value must represent a valid numeric value. Lastly, the EXPIRY valid is a text reference to a named entry in the edco_expire_configs table (as sequence value of 1 may always bused).

3.2 EDCO Symbol Processing Engine Operation

In some aspects, the EDCO symbol processing engine (also referred to herein as the EDCO engine) is scheduled to run at a particular time depending on the host target exchange (i.e., after the start of GTH for C1, and after the start of the RTH queuing period for C2 and EDGX). The EDCO engine iterates over the defined EDCO templates and template instances as provisioned in the EDCO schema to pre-create the specified complex instruments. The following are features of the EDCO engine that can be specifically implemented to realize system requirements.

3.2.1 Duplicate Instance Skipping

In some aspects, the EDCO engine can routinely encounter specifications of duplicate complex instruments. Prior to invoking the ME GSM command for creating complex instruments, the EDCO engine can check to ensure that the exact complex instrument wasn't previously requested during processing of the same edco_type. Duplicate instruments across different edco_type values must not be skipped so that the same complex symbol will appear multiple times in the edco_symbol_daily table indicating membership of the same complex instrument in multiple EDCO sets.

Consider the example in which one EDCO set specifies a calendar spread with expirations specified as F1-S1 (i.e., next Friday weekly and the next serial standard SPX contract) and D2-S1 (i.e., the next day expiring 0DTE weekly and the next serial SPX standard contract). On one day per serial month (i.e., not overlapping with a quarterly contract), these expiration pairs will resolve to the same expiration date pair. In this case the expiration pair referenced twice is created once.

3.2.2 Invalid Expiration Configs

Per the description of the edco_expire_configs table as described herein, the DSL is specifically designed to enable the specification of calendar spread expiration configurations that are not valid at certain time of the year. The rule to be applied by the EDCO engine is that the mapped expiration dates for a multi-sequence expiration configuration can be strictly ascending by expire sequence. Any expiration configuration that violates this rule can be considered invalid. The EDCO engine will detect a reference to an invalid expiration sequence in one or more legs of a template instance and will skip processing of that template instance.

3.2.3 References to Unlisted Expirations or Strikes

In some aspects, expiration configurations and strike configurations specified in using the EDCO DSL (i.e., EDCO table schema provisioning) can result in expiration dates and strike values that have not been validated against the actual listed contract expirations and listed strikes. The EDCO engine will validate the mapped expiration dates and strike values while processing template instances and can skip the GSM creation request of any template instance that reference an unlisted contract expiration or strike price.

3.2.4 ME GSM Invoked on Symbol Associated Matching Unit

In some aspects, the prior to invoking the matching engine GSM command for each complex instrument (i.e., for each template instance) the EDCO engine determines the associated matching based on the leg OSI roots. For example, if the OSI root of all legs is "SPX", the GSM command on ME 33 is invoked. If the OSI root of all legs is "SPXW", the GSM command on ME 34 is invoked. If the OSI roots of the instance legs are a combination of "SPX" and "SPXW", the GSM command on ME 35 is invoked. Similar matching unit mapping is performed for non-SPX proprietary options and multi-list instruments or values.

3.2.5 EDCO Engine Operation Logging

In some aspects, the EDCO engine can create a log of operation that will be useful for operational troubleshooting as necessary. The edco_symbol_daily table can contain a record of all successfully created EDCOs. In some implementations, what is not captured in the edco_symbol_daily table are the following conditions, each of which should be represented in EDCO engine logging: (1) EDCOs that were skipped as a result of invalid expire configs; (2) EDCOs that were skipped as a result of referencing unlisted expirations; (3) EDCOs that were skipped as a result of referencing unlisted strike prices; and (4) EDCOs that were not created due to GSM command failures.

3.3 EDCO Specification Examples

In the following sections, examples are presented to demonstrate the use of the framework DSL features. FIG. 3A illustrates example code 310 for inserting calendar data into a database, which may be implemented by the EDCO system of FIG. 1 in accordance with various embodiments disclosed herein. FIG. 3A illustrates multiple code examples (e.g., SQL) examples for inserting data into a database table of a database (e.g., database 106). As indicated in FIG. 3A, and as used in the examples of FIGS. 3A-3E and 4B, the sample code is pseudo code that is abbreviated to remove the beginning SQL code statements (e.g., INSERT INTO . . . ) such that only the values are represented. It is to be understood, however, that the abbreviated code statements can represent insert statements for SQL code for inserting data into a database table of any of the given tables defined by the table schemas identified herein for inserting data into a database (e.g., database 106).

For example, full code statements in box 311 can be abbreviated to pseudo code statements of 312. Likewise, each of the code statements in boxes 313, 314, 315, 316, 317, and 318 are abbreviated pseudo code statements for inserting data (e.g., calendar data) into various calendar implementations, including a 0DTE calendar, a DOW calendar, a seria monthly calendar, a monthly calendar, a quarterly calendar, and a select month calendar, respectively.

In the examples below, the begin_dt and end_dt fields are provisioned with placeholder tokens rather than date values.

3.3.1 Box Spreads with Fixed Strikes on Prompt Standard Contract

FIG. 3B illustrates example code 320 for inserting box spread data into a database, which may be implemented by the EDCO system of FIG. 1 in accordance with various embodiments disclosed herein.

In the pseudo code example of FIG. 3B, a product named "PROD_A" requires a single Box Spread with strikes 4000 and 5000 to be defined on the prompt standard contract. Market makers are to be allowed to rest orders on the COB. This example demonstrates the use of constant strike configs.

3.3.2 ATM Vertical Put and Call Spread on First Two Standard Contracts

FIG. 3C illustrates example code 330 for inserting put and call spread data into a database, which may be implemented by the EDCO system of FIG. 1 in accordance with various embodiments disclosed herein.

In the pseudo code example of FIG. 3C, a product named "PROD_B" requires a $10 wide SPX ATM vertical put and call spread on the first two serial standard contracts. Market makers are to be allowed to rest orders on the COB. This example demonstrates the use of the FORWARD strike algorithm plugin with arguments specified using the edco-_strike_config_args table.

3.3.3 Range of Vertical Put and Call Spread on First Two Standard Contracts

FIG. 3D illustrates further example code 340 for inserting put and call spread data into a database, which may be implemented by the EDCO system of FIG. 1 in accordance with various embodiments disclosed herein.

In the pseudo code example of FIG. 3D, a product named "PROD_C" requires $10 wide SPX vertical put spreads with one spread containing the ATM strike as the long leg, and 9 additional vertical put spreads struck below the ATM strike in $10 increments. The product also requires $10 wide SPX vertical call spreads with one spread containing the ATM strike as the long leg, and 9 additional $10 wide vertical call spreads struck above the ATM strike in $10 increments. Market makers are to be allowed to rest orders on the COB.

3.3.4 Rolling Delta to Next Lead Contract Using Jelly Rolls

FIG. 3E illustrates further example code 350 for inserting put and call spread data into a database, which may be implemented by the EDCO system of FIG. 1 in accordance with various embodiments disclosed herein.

In the pseudo code example of FIG. 3E, a product named "PROD_D" requires the ability to roll delta from 0DTE, next Weekly Friday expiring option and the prompt standard contract to the next expiring lead contract, where lead contract is defined as the standard quarterly expiration on a date 19 trading days in the future (i.e., pre-rolled from the standard quarterly contract by 19 trading days). Four leg complex calendar spreads comprising a short combo on the first expiry (i.e., rolling from) and a long combo on the second expiry (i.e., rolling to). The strike price of both combos is the same and is set to the rounded forward associated with the next lead contract. Market makers are to be able to rest orders in the COB.

4 Quoted Spread Book EDCO Provisioning and Implementation

The following three sections present the EDCO provisioning data that can be used to create the complex instruments used by the Quoted Spread Book (QSB) product. Additional quoted spreads can also be implemented.

The provisioning data below makes use of the edco_cal-endars data presented in section 3.3 herein. The begin_dt and end_dt fields of the edco_template_instances table are provisioned with place holder tokens and not actual dates.

FIG. 4A illustrates a table 410 (Table 8) of values for quoted spread book EDCO provisioning, which may be implemented by the EDCO system of FIG. 1 in accordance with various embodiments disclosed herein. The edco_type and edco_subtype values used for Quoted Spread Book instrument provisioning are listed in Table 8 of FIG. 4A.

Table 410 outlines classifications within the Quoted Spread Book (QSB) framework, detailing three specific subtypes of financial instruments. Each entry shares the common edco_type value of "QSB" and is distinguished by a unique edco_subtype. These include BOX_SPREAD, referring to Quoted Spread Book Box Spreads; BOX_-SWAP, indicating Quoted Spread Book Box Spread Rolls (also known as Box Swaps); and JELLY_ROLL, which represents Quoted Spread Book Combo Rolls, commonly referred to as Jelly Rolls. The descriptions provide a concise explanation of each subtype, indicating the nature of the financial strategy or instrument it represents within the quoted spread book context.

4.1 Box Spreads FIG. 4B illustrates an example database table 420 and code for populating the database table 420 regarding quoted spread book box spread expiration values, which may be implemented by the EDCO system of FIG. 1 in accordance with various embodiments disclosed herein.

In the example, QSB Box Spreads can comprise 4000-5000 strike Box Spreads on the first 4 serial, the first two quarterly and the first four December standard SPX contracts.

In the example of FIG. 4B, table 420 contains ten columns labeled "Serial-1" through "Serial-4," "Qtr-1" through "Qtr-3," and "Dec-1" through "Dec-3." Each column contains a single entry marked with an "X," which in this context represents a null value. In this example, for each of the identified serial, quarterly, and December-specific data points, no valid data is available or has been recorded. The consistent presence of "X" across all columns indicates that each respective category is currently holding a null or placeholder value.

4.2 Box Spread Rolls

Figure 4C:
FIG. 4C illustrates values of quoted spread Book Box swap expiration pairs, which may be implemented by the EDCO system of FIG. 1 in accordance with various embodiments disclosed herein.

FIG. 4C illustrates values 430 of quoted spread Book Box swap expiration pairs, which may be implemented by the EDCO system of FIG. 1 in accordance with various embodiments disclosed herein.

QSB Box Spread Rolls (aka, Box Swaps) will comprise rolls of Box Spreads from the first 4 serial and the first two quarterly standard SPX contracts to select forward contract expirations as shown in FIG. 4C herein.

By convention, buying a QSB Box Swap is rolling a long Box Spread forward in time (i.e., selling the earlier expiration and buying the later expiration. The shaded expiration pairs in FIG. 4C are pairs in which the time order of the pair may switch over time. For example, there are times when the 2nd serial contract expiration is before the first quarterly expiration and times when it is after. In any event, buying the associated Box Swap can be rolling a long position forward in time.

4.3 Jelly Rolls

Figure 4D:
FIG. 4D illustrates values of quoted spread Jelly Roll swap expiration pairs, which may be implemented by the EDCO system of FIG. 1 in accordance with various embodiments disclosed herein.

FIG. 4D illustrates values 440 of quoted spread Jelly Roll swap expiration pairs, which may be implemented by the EDCO system of FIG. 1 in accordance with various embodiments disclosed herein.

QSB Jelly Rolls can be used for rolling combos (i.e., long Call and short Put at the same strike and expiration) from one expiration to another. Jelly Rolls are typically used for managing delta in portfolios of options positions. By convention buying a QSB Jelly Roll rolls a long combo from the earlier expiration to a later expiration (i.e., selling the earlier expiration combo and buying the later expiration combo).

FIG. 4D values 440 illustrate the Jelly Roll expirations pairs. In the example, of FIG. 4D, the expirations labeled Today, Tmr and Friday-1 are the 0-DTE (Today), 1-DTE (Tmr) and next Friday (Friday-1) are weekly SPXW expirations, Serial-1, Serial-2 and Serial-3 are the nearby serial (i.e., non-quarterly) monthly SPX contract expirations, and Qtr-1, Qtr-2 and Qtr-3 are the nearby quarterly SPX contract expiration. The cells in FIG. 4D marked WW roll a weekly expiration combo to a forward weekly expiration combo. The cells marked WX roll a weekly expiration combo to a forward standard expiration combo. The cells marked XX roll a standard expiration combo to a forward standard expiration.

The shaded expiration pairs in FIG. 4D herein are pairs in which the time order of the pair may switch over time. For example, there are times when the second serial contract expiration is before the first quarterly expiration and times when it is after. In any event, buying the associated Box Swap will be rolling a long position forward in time.

The outlined cells in FIG. 4D herein indicates pairs for which there are times within the calendar year when both expirations in the pair may resolve to the same expiration date. On such dates, no associated expiration pair is created.

The cells in FIG. 4D marked WW roll a weekly expiration combo to a forward weekly expiration combo. The cells marked WX roll a weekly expiration combo to a forward standard expiration combo. The cells marked XX roll a standard expiration combo to a forward standard expiration.

The anchor strike for all expirations is computed using the rounded put-call parity implied forward level using the options of the nearest quarterly using the current trading date advanced by 19 trading days (i.e., pre-rolled by 19 trading days). The anchor strike is computed as follows: (1) current trading date advanced 19 trading days into the future; (2) anchor expiration is the prompt quarterly contract on the advanced date; (3) the put-call parity implied forward level is computed using the anchor expiration options; and (4) the anchor strike is the forward value is rounded to the nearest $25 increment.

5 Introduction (Cboe Quoted Spread Book Usage)

Certain commonly traded SPX (e.g., SP 500 index) complex instruments, including box spreads, box swaps, and jelly rolls (combo rolls) are traded predominantly in open outcry for best execution and liquidity. One reason these complex instruments are traded in open outcry is because Market Makers (MM) cannot rest orders in SPX/SPXW complex instrument Complex Order Books (COBs) during Regular Trading Hours (RTH). As a result, displayed markets for electronic COBs are commonly derived from the synthetic best bid and offer derived from the constituent single leg option order books.

To facilitate electronic trading in commonly traded complex instruments, and to concentrate liquidity into a select set of Exchange-designated instruments, the Quoted Spread Book (QSB) service (computing software) can be implemented by one or more processors of system 100 (as described for FIG. 1 herein), which defines a subset of complex instruments for which MMs are allowed to rest orders in the COB. The QSB software implementation comprises select Box Spread, Box Swap, and Jelly Roll complex instruments. Although it is to be understood that different and/or additional complex instruments may be implemented. Market Maker refers to capacities M and N. Further, appointments are not required to rest orders.

Prior to QSB, all complex instruments traded on the Cboe Exchange were created in response to customer initiated complex instrument creation requests via the FIX and BOE order entry protocols. Using FIX, customers use a two-step instrument creation request in which a Security Definition Request message is sent, Cboe responds with the symbol id associated with the requested instrument, then the customer can enter orders using that symbol id. Customers using FIX can also use a one-step instrument creation process using a Long Form New Order Multileg message. Using BOE, customers use a two-step process that includes a New Complex Instrument message to create a complex symbol, the response to which is a Complex Instrument Accepted message containing the symbol id of the created instrument.

QSB introduces Exchange-designated complex instruments. Complex instruments designated by the Exchange with QSB are standard complex instruments that the Exchange ensures will exist for trading in RTH and provides symbol reference data prior to the beginning of RTH. Further, MMs are allowed to rest orders in the COB during Regular Trading Hours (RTH) for QSB designated complex instruments.

Market makers that quote QSB instruments and brokerage trading platforms that highlight QSB symbols require access to the symbol ids and symbol reference data associated with QSB Exchange-designated complex symbols prior to the start of the RTH session. QSB symbol reference data is provided via two delivery mechanisms; 1) JSON formatted file download Cboe US Options Reference Data, and 2) a new Exchange Designated Complex Instrument Definition message disseminated on the Cboe US Options Complex Multicast PITCH and TOP data feeds.

The following sections provide detail on the two QSB symbol reference data delivery mechanisms followed by specification of the QSB instrument universe.

6 QSB Symbol Reference Data

Access to QSB symbol reference data is provided through file download from a URL accessible directly on the Cboe.com reference data page (e.g., server 108), or via Exchange Designated Complex Instrument Definition messages on the Cboe US Options Multicast PITCH and TOP market data feeds (e.g., TOP data feed 110 and/or PITCH data feed 112). For both delivery mechanisms, QSB symbol reference data are available starting at 7:00 am ET.

6.1 Cboe.com Reference Data

Market maker and brokerage trading platforms requiring access to QSB symbol reference data prior to the start of RTH may download a JSON file using a URL on the Cboe US Options Reference Data page (e.g., server 108) titled "Quoted Spread Book (JSON)". The JSON file format is outlined in FIG. 5. FIG. 5 illustrates example code for transmission of Quoted Spread Book (QSB) Symbol reference data over a computer network, which may be implemented by the EDCO system of FIG. 1 in accordance with various embodiments disclosed herein.

The JSON file or otherwise data of FIG. 5 is a list comprises three dictionaries, one each associated with QSB type and BOX_SPREAD, BOX_SWAP, and JELLY_ROLL complex instrument subtypes. Within each dictionary is a list of the "Symbols" (i.e., distinct complex instruments of that type) each specifying the complex symbol id (i.e., Complex Instrument Id) and the leg metadata associated with each symbol id.

The JSON element names "Complex Instrument Id", "Leg Count", "Leg Symbol", and "Leg Ratio" are chosen specifically to align with the fields of the Complex Instrument Definition Expanded message from the Cboe US Options Complex Options PITCH and TOP data feeds. The "OSI Symbol" element associated with each leg is provided for convenience. The JSON file for QSB on the Cboe website is used to identify the complex instrument id subset that corresponds to QSB instruments for which Market Makers are allowed to rest orders in the COB.

A similar link labeled "HTML" is provided on the same Cboe Reference Data web page (e.g., webpage accessible at server 108) for access a formatted display of the QSB symbols on a trading date. The HTML presentation is typically used by MM and platform vendor development, QA and operations staff as necessary for development and validation.

6.2 Exchange Designated Complex Instrument Definition Message

Market makers and brokerage trading platform vendors may access QSB symbol reference data by processing the Exchange Designated Complex Instrument Definition (ED-CID) message on the Cboe US Options Complex PITCH and TOP market data feeds.

The EDCID message is disseminated in addition to the Complex Instrument Definition Expanded message for the QSB complex instruments. In other words, the EDCID message is supplementary information that provides and mapping of the Cboe Exchange complex instruments that are QSB instruments and their group associations (i.e., QSB BOX_SPREAD, QSB BOX_SWAP and QSB JELLY_ROLL).

EDCID messages are available on Complex PITCH and TOP market data feeds in a background loop throughout the trading day. In addition, EDCID messages will appear in the Complex PITCH and TOP Spin Request and Instrument Definition Request output.

See the Cboe US Options Complex PITCH and TOP market data feed specifications for detail on the new EDCID message.

7 QSB Instrument Type Detail

The following sections detail the algorithmic creation of QSB instrument by type for Box Spreads, Box Swaps and Jelly Rolls on each trading date.

7.1 QSB Box Spread

QSB Box Spreads are created each trading date using strikes 4000 and 5000 (i.e., $100,000 notional) on the first four serial, the first three quarterly, and the first three December standard SPX expirations. By convention Buying a QSB Box Spread is buying the 4000 Call, selling the 5000 Call, selling the 4000 Put and buying the 5000 Put. The table of FIG. 4B herein illustrates the QSB Box Spreads created each trading date.

The EDCID message EDCI Type value for QSB Box Spreads is "QSB" and the EDCI Subtype value is "BOX_SPREAD".

7.2 QSB Box Swap

QSB Box Swaps are used for rolling expirations of 4000/5000 strike standard SPX expiration Box Swaps to forward standard SPX expirations. By convention, buying a QSB Box Swap is rolling a long Box Spread forward in time (i.e., selling the earlier expiration and buying the later expiration. FIG. 4C herein illustrates the QSB Box Swap roll expirations pairs.

The EDCID message EDCI Type value for QSB Box Swaps is "QSB" and the EDCI Subtype value is "BOX_SWAP".

The shaded expiration pairs in FIG. 4C herein are pairs in which the time order of the pair may switch over time. For example, there are times when the first serial contract (Serial-1) expiration is before the first quarterly expiration (Qtr-1) and times when it is after. The gray background expiration pairs indicated in FIG. 4C will flip the FROM and TO expirations to maintain the convention that buying the Box Swap rolls a long Box Spread forward in time.

The outlined cell in FIG. 4C herein indicates a singular expiration pair for which there are times within the calendar year when Qtr-1 and Dec-1 refer to the same contract expiration. During those times when Qtr-1 and Dec-1 resolve to the same contract expiration date, no associated contract spread is created.

7.3 QSB Jelly Roll

QSB Jelly Rolls are used for rolling combos (i.e., long Call and short Put at the same strike and expiration) from one expiration to another. Jelly Rolls are typically used for managing delta in portfolios of options positions. By convention buying a QSB Jelly Roll rolls a long combo from the earlier expiration to a later expiration (i.e., selling the earlier expiration combo and buying the later expiration combo). FIG. 4D herein illustrates the Jelly Roll expirations pairs. The EDCID message EDCI Type value for QSB Jelly Rolls is "QSB" and the EDCI Subtype value is "JELLY_ROLL".

With further reference to FIG. 4D, the expirations labeled Today and Tmr are the 0-DTE and 1-DTE expirations respectively. Note 0-DTE and 1-DTE options are technically weekly expiring SPXW contracts. Friday-1 is the next Friday expiring weekly SPXW contract. Serial-1, Serial-2 and Serial-3 are standard monthly SPX contract expirations that skip the quarterly March, June, September and December standard contract expiration. Lastly, Qtr-1, Qtr-2 and Qtr-3 are quarterly standard monthly SPX contract expirations in the set comprising March, June, September and December.

The cells in FIG. 4D marked WW roll a weekly expiration combo to a weekly expiration combo forward in time. The cells marked WX roll a weekly expiration combo to a forward standard expiration combo. The cells marked XX roll a standard expiration combo to a forward standard expiration. These distinctions are significant as SPX-SPX complex order books are hosted on matching unit 33, SPXW-SPXW complex order books are hosted on matching unit 34, and the cross SPX-SPXW complex order books are hosted on matching unit 35.

The shaded expiration pairs in FIG. 4D herein are pairs in which the time order of the pair may switch over time. For example, there are times when the first serial expiration (Serial-1) is before the first quarterly expiration and times when it is after. The shaded expiration pairs will flip as appropriate to maintain the convention that buying a Jelly Roll is to roll a long combo position from the earlier to the later expiration.

The outlined cell in FIG. 4D herein indicates a two expiration pairs for which there are time within the calendar year when the pair refer to the same expiration date. The two are 1) when Tmr expiration date is the same as the Qtr-1 expiration date (i.e., the day before the expiration of the first quarterly contract), and 2) when the Friday-1 expiration date is the same as the Qtr-1 expiration date. On those specific dates, when the expiration dates comprising pair resolve to the same contract expiration, no associated contract spread is created.

Each trading date, an "Achor Strike" is calculated by using the put-call parity implied forward price at the next Lead contract expiration rounded to the nearest $50. The Lead contract is defined as the next quarterly contract on a date advanced 9 days forward from the current date. In other words, the Lead contract in this context is the next quarterly control pre-rolled by 9 trading days.

For each Jelly Roll expiration combination shown in FIG. 4D herein, seven distinct Jelly Rolls are created as QSB instruments differing only by strike. The anchor strike comprises one of the seven. Three additional strikes above the anchor strike in increments of $50, and three additional strikes below the anchor strike in increments of $50 complete the seven.

8 Example Systems and Methods

Figure 6:
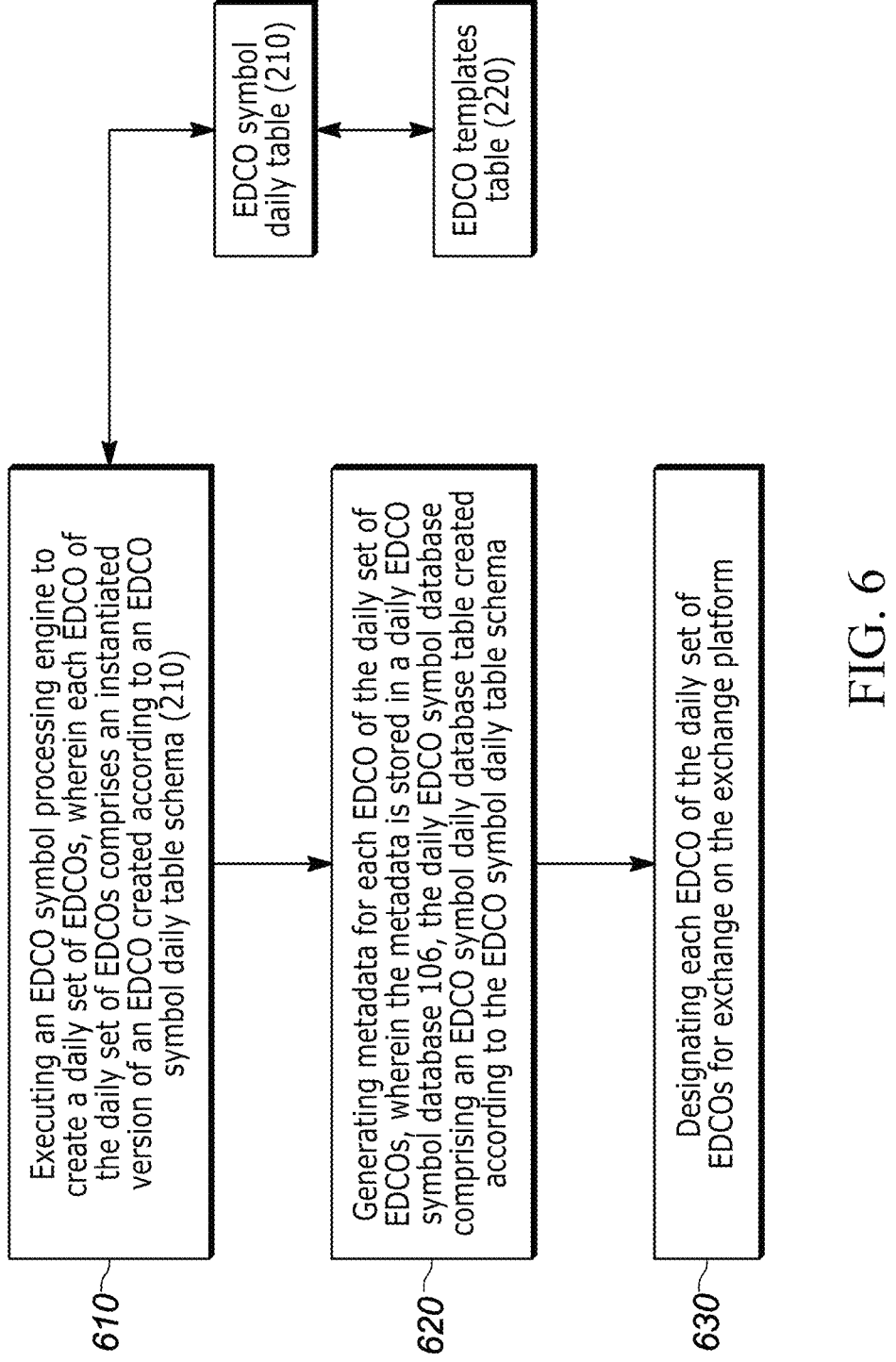
FIG. 6 illustrates a flow diagram of an example exchange designated complex option (EDCO) method implementing zero additive impact representations of EDCOs in accordance with various embodiments disclosed herein.

FIG. 6 illustrates a flow diagram of an example exchange designated complex option (EDCO) method 600 implementing zero additive impact representations of EDCOs in accordance with various embodiments disclosed herein. EDCO method 600 may be implemented by one or more processors, for example, one or more processors of the server(s) of EDCO system 100 as described herein. At block 610, method 600 comprises executing (e.g., by the one or more processors of EDCO system 100) an EDCO symbol processing engine (e.g., as described herein for FIG. 1) to create a daily set of EDCOs. Each EDCO of the daily set of EDCOs may comprise an instantiated version of an EDCO created according to the ECDO symbol daily table schema. In various aspects, each EDCO of the daily set of EDCOs is created having a zero additive computer processing impact on the exchange platform compared with the non-EDCO instruments of the exchange platform.

For example, as described herein for section 2.1, each trading day the EDCO symbol processing engine reads EDCO specification data from the ECDO symbol daily table schema (e.g., ECDO symbol daily table schema 210 as shown and described for FIG. 2A herein) and translates that data into specific complex instruments (e.g., EDCOs, such as the daily set of EDCOs) to be designated by the exchange platform of the EDCO system 100. As shown for FIG. 1, the EDCO symbol processing engine may invoke the matching engine 102's GSM command for each complex instrument (e.g., each EDCO) to be designated, which may cause the EDCOs, such as the daily set of EDCOs, to be generated by the ECDO framework 114 accessing the provisioned named EDCO templates 116 as defined by the EDCO template table schema (e.g., EDCO template table schema 220 as described herein for FIG. 2B).

In various aspects, creation of the daily set of EDCOs comprises indicating a type for each EDCO of the daily set of EDCOs. For example, as described in section 2.1 herein, when the EDCO framework (e.g., ECDO framework 114 as shown for FIG. 1) invokes the matching engine 102 GSM command to designate a complex instrument (e.g., an EDCO), GSM arguments specify EDCO type information. Such type information is shown, by way of non-limiting example, as an edco_type value in each of the ECDO symbol daily table schema 210 and EDCO template table schema 220 respective fields.

In some aspects, creation of the daily set of EDCOs may comprise indicating whether any EDCO of the daily set of EDCOs is able to be included as a part of a rested order on a complex order book. For example, ECDO symbol daily table schema 210 and EDCO template table schema 220 each have fields (e.g., allow_mm_rest) to be set if market makers are ae allowed to rest an order. In this way, when the EDCO framework invokes the matching engine 102 to call the GSM command to designate a complex instrument (e.g., and EDCO), GSM arguments specify an indicator (e.g., via the allow_mm_rest value) of whether to allow market makers to rest orders in a book (e.g., complex order book (COB)) associated with the instrument.

In additional aspects, at least one EDCO may comprise an existing EDCO previously created by the EDCO symbol processing engine. The existing EDCO can be designated for exchange on the exchange platform, for example, along with any newly created EDCOs.

At block 620, method 600 further comprises generating metadata for each EDCO of the daily set of EDCOs. The metadata is stored in the daily EDCO symbol database 106. For example, In some aspects, creation of each EDCO of the daily set of EDCOs can comprise writing metadata comprising data from the ECDO template table schema (e.g., EDCO template table schema 220 as described herein for FIG. 2B) to the daily EDCO symbol database (106) as defined by the ECDO symbol daily table schema 210. For example, as described in section 2.1 herein, when the GSM command (as shown for FIG. 1) is executed to create an EDCO complex instrument, EDCO metadata is generated and stored to database 106 (e.g., a MONGO database) via a CRUD command (e.g., via MONGO DBWR 104) by adding such metadata to the database. The EDCO metadata added via CRUD command (e.g., via MONGO DBWR 104) can be provided as arguments to the GSM command and can be used by the CRUD command (i.e., the database writer) to populate the edco_symbol_daily database table (e.g., a database table instantiated from the ECDO symbol daily table schema 210 as shown and described for FIG. 2A herein).

At block 630, method 600 further comprises designating each EDCO of the daily set of EDCOs for exchange on the exchange platform. In various aspects, information of the daily set of EDCOs may be provided over a computer network via a downloadable file (e.g., a JSON file) at a server 108 with information of the daily set of EDCO. Additionally, or alternatively, information of the daily set of EDCOs may be provided over a computer network via one or more data feeds (e.g., TOP data feed 110 and/or PITCH data feed 112) with information of the daily set of EDCOs.

For example, as described for section 2.1, users require the ability to discover which complex instruments are members of Exchange Designated Complex Options sets. System 100 provides at least two methods for ECDO symbol discovery. A JSON formatted file can be accessible form the Cboe.com (e.g., server 108). Additionally, or alternatively, exchange designated complex instrument definition messages can be sent and received over complex PITCH (112) and TOP (110) data feeds in real time for receipt and processing by user computing devices.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the hardware modules described may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed is:

1. An exchange designated complex option (EDCO) system implementing zero additive impact representations of EDCOs, the EDCO system comprising:
   an order handler communicatively coupled to an exchange platform and configured to receive requests for EDCOs and non-EDCO instruments;
   a matching engine communicatively coupled to the order handler and the exchange platform;

an ECDO framework communicatively coupled to the matching engine and comprising an EDCO symbol processing engine;

a computer memory storing an EDCO template table schema defining provisioned named EDCO templates for instantiating zero additive impact representations of each of a plurality of EDCOs for exchange on the exchange platform, wherein the computer memory further stores an ECDO symbol daily table schema configured to define daily representations of the plurality of EDCOs;

a daily EDCO symbol database comprising an EDCO symbol daily database table created according to the ECDO symbol daily table schema, and;

one or more processors configured to execute computing instructions stored in a tangible, non-transitory computer-readable storage medium, where the computing instructions, when executed by the one or more processors, are configured to:

execute the EDCO symbol processing engine to create a daily set of EDCOs, wherein each EDCO of the daily set of EDCOs comprises an instantiated version of an EDCO created according to the ECDO symbol daily table schema, generate metadata for each EDCO of the daily set of EDCOs, wherein the metadata is stored in the daily EDCO symbol database, and designate each EDCO of the daily set of EDCOs for exchange on the exchange platform.

2. The ECDO system of claim 1, wherein creation of each EDCO of the daily set of EDCOs comprises writing metadata comprising data from the ECDO template table schema to the daily EDCO symbol database as defined by the ECDO symbol daily table schema.

3. The ECDO system of claim 2, wherein each EDCO is created based on the provisioned named EDCO templates.

4. The ECDO system of claim 1, wherein creation of the daily set of EDCOs comprises indicating whether any EDCO of the daily set of EDCOs is able to be included as a part of a rested order on a complex order book.

5. The ECDO system of claim 1, wherein creation of the daily set of EDCOs comprises indicating a type for each EDCO of the daily set of EDCOs.

6. The ECDO system of claim 1, wherein the EDCO symbol daily database table is reset daily.

7. The ECDO system of claim 1, wherein each EDCO of the daily set of EDCOs is created having a zero additive computer processing impact on the exchange platform compared with the non-EDCO instruments of the exchange platform.

8. The ECDO system of claim 1, wherein information of the daily set of EDCOs are provided over a computer network via at least one of: (1) providing a downloadable file at a server with information of the daily set of EDCOs; and/or (2) providing one or more data feeds with information of the daily set of EDCOs.

9. The ECDO system of claim 1, wherein at least one EDCO is an existing EDCO previously created by the EDCO symbol processing engine, and wherein the existing EDCO is designated for exchange on the exchange platform.

10. An exchange designated complex option (EDCO) method implementing zero additive impact representations of EDCOs, the EDCO method comprising:

executing an EDCO symbol processing engine to create a daily set of EDCOs, wherein each EDCO of the daily set of EDCOs comprises an instantiated version of an EDCO created according to an ECDO symbol daily table schema, wherein the EDCO symbol processing engine is implemented as part of an ECDO framework communicatively coupled to a matching engine, the matching engine communicatively coupled to an order handler and an exchange platform, and the order handler communicatively coupled to an exchange platform and configured to receive requests for EDCOs and non-EDCO instruments, wherein the ECDO symbol daily table schema defines daily representations instantiated from a plurality of EDCOs for trade in a given day, and wherein an EDCO template table schema defines provisioned named EDCO templates for instantiating zero additive impact representations of each of the plurality of EDCOs for exchange on the exchange platform;

generating metadata for each EDCO of the daily set of EDCOs, wherein the metadata is stored in a daily EDCO symbol database, the daily EDCO symbol database comprising an EDCO symbol daily database table created according to the ECDO symbol daily table schema; and designating each EDCO of the daily set of EDCOs for exchange on the exchange platform.

11. The ECDO method of claim 10, wherein creation of each EDCO of the daily set of EDCOs comprises writing metadata comprising data from the ECDO template table schema to the daily EDCO symbol database as defined by the ECDO symbol daily table schema.

12. The ECDO method of claim 11, wherein each EDCO is created based on the provisioned named EDCO templates.

13. The ECDO method of claim 10, wherein creation of the daily set of EDCOs comprises indicating whether any EDCO of the daily set of EDCOs is able to be included as a part of a rested order on a complex order book.

14. The ECDO method of claim 10, wherein creation of the daily set of EDCOs comprises indicating a type for each EDCO of the daily set of EDCOs.

15. The ECDO method of claim 10, wherein the EDCO symbol daily database table is reset daily.

16. The ECDO method of claim 10, wherein each EDCO of the daily set of EDCOs is created having a zero additive computer processing impact on the exchange platform compared with the non-EDCO instruments of the exchange platform.

17. The ECDO method of claim 10, wherein information of the daily set of EDCOs are provided over a computer network via at least one of: (1) providing a downloadable file at a server with information of the daily set of EDCOs; and/or (2) providing one or more data feeds with information of the daily set of EDCOs.

18. The ECDO method of claim 10, wherein at least one EDCO is an existing EDCO previously created by the EDCO symbol processing engine, and wherein the existing EDCO is designated for exchange on the exchange platform.

19. A tangible, non-transitory computer-readable medium storing instructions for implementing zero additive impact representations of exchange designated complex options (EDCOs), that when executed by one or more processors cause the one or more processors to:

execute an EDCO symbol processing engine to create a daily set of EDCOs, wherein each EDCO of the daily set of EDCOs comprises an instantiated version of an EDCO created according to an ECDO symbol daily table schema, wherein the EDCO symbol processing engine is implemented as part of an ECDO framework communicatively coupled to a matching engine, the matching engine communicatively coupled to an order handler and an exchange platform, and the order handler communicatively coupled to an exchange platform and configured to receive requests for EDCOs and non-EDCO instruments, wherein the ECDO symbol daily table schema defines daily representations instantiated from a plurality of EDCOs for trade in a given day, and wherein an EDCO template table schema defines provisioned named EDCO templates for instantiating zero additive impact representations of each of the plurality of EDCOs for exchange on the exchange platform;

generate metadata for each EDCO of the daily set of EDCOs, wherein the metadata is stored in a daily EDCO symbol database, the daily EDCO symbol database comprising an EDCO symbol daily database table created according to the ECDO symbol daily table schema; and designate each EDCO of the daily set of EDCOs for exchange on the exchange platform.

\* \* \* \* \*